United States Patent
Aybay et al.

(10) Patent No.: US 8,578,191 B2
(45) Date of Patent: Nov. 5, 2013

(54) DYNAMIC FABRIC PLANE ALLOCATION FOR POWER SAVINGS

(75) Inventors: Gunes Aybay, Los Altos, CA (US); Jaya Bandyopadhyay, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 480 days.

(21) Appl. No.: 12/797,996

(22) Filed: Jun. 10, 2010

(65) Prior Publication Data

US 2011/0307718 A1    Dec. 15, 2011

(51) Int. Cl.
*G06F 1/00* (2006.01)
*H04L 12/28* (2006.01)
*H04Q 11/00* (2006.01)

(52) U.S. Cl.
USPC .................. 713/310; 370/351; 370/388

(58) Field of Classification Search
USPC .......................... 709/232; 715/736
See application file for complete search history.

(56) References Cited

U.S. PATENT DOCUMENTS

| | | |
|---|---|---|
| 5,502,689 A | 3/1996 | Peterson et al. |
| 5,524,096 A | 6/1996 | Roohparvar |
| 6,308,240 B1 | 10/2001 | De Nicolo |
| 6,446,213 B1 | 9/2002 | Yamaki |
| 6,907,534 B2 | 6/2005 | Ku |
| 6,985,969 B1 | 1/2006 | Cheng |
| 6,996,651 B2 | 2/2006 | Garinger et al. |
| 7,139,860 B2 | 11/2006 | Walker et al. |
| 7,154,902 B1 | 12/2006 | Sikdar |
| 7,228,441 B2 | 6/2007 | Fung |
| 7,287,148 B2 | 10/2007 | Kanapathippillai et al. |
| 7,320,080 B2 | 1/2008 | Solomon et al. |
| 7,353,415 B2 | 4/2008 | Zaretsky et al. |
| 7,356,033 B2 | 4/2008 | Basu et al. |
| 8,457,121 B1 * | 6/2013 | Sharma et al. ............ 370/389 |
| 2002/0138777 A1 | 9/2002 | Feierbach |
| 2004/0044915 A1 | 3/2004 | Bose et al. |
| 2004/0163001 A1 | 8/2004 | Bodas |
| 2005/0097371 A1 | 5/2005 | Broyles |
| 2005/0215275 A1 | 9/2005 | Edwards et al. |
| 2006/0080560 A1 | 4/2006 | Miller |
| 2006/0156041 A1 | 7/2006 | Zaretsky et al. |
| 2006/0206730 A1 | 9/2006 | Cartes et al. |

(Continued)

OTHER PUBLICATIONS

U.S. Appl. No. 12/347,688, filed Dec. 31, 2008, entitled "Methods and Apparatus for Provisioning and Managing Power" (27 pgs).

(Continued)

*Primary Examiner* — Kim Huynh
*Assistant Examiner* — Vincent Chang
(74) *Attorney, Agent, or Firm* — Cooley LLP

(57) ABSTRACT

In one embodiment, a method includes accessing a first utilization value, accessing a second utilization value, defining a third utilization value, and sending to a first switching portion of a distributed network switch a deactivate signal in response to the third utilization value. The first utilization value is associated with the first switching portion of the distributed network switch. The second utilization value is associated with a second switching portion of the distributed network switch. The third utilization value is associated with the second switching portion of the distributed network switch and is based on the first utilization parameter and the second utilization parameter. The first switching portion of the distributed network switch ceases communication within the distributed network switch in response to the deactivate signal.

18 Claims, 14 Drawing Sheets

(56) References Cited

U.S. PATENT DOCUMENTS

| | | |
|---|---|---|
| 2006/0206737 A1 | 9/2006 | Lee |
| 2007/0074054 A1 | 3/2007 | Chieh |
| 2007/0124684 A1* | 5/2007 | Riel et al. .................. 715/736 |
| 2007/0266264 A1 | 11/2007 | Lewites et al. |
| 2009/0119396 A1* | 5/2009 | Kanda ........................ 709/223 |

OTHER PUBLICATIONS

U.S. Appl. No. 12/347,680, filed Dec. 31, 2008, entitled "Methods and Apparatus for Provisioning and Managing Power" (28 pgs).

U.S. Appl. No. 12/350,729, filed Jan. 8, 2009, entitled "Methods and Apparatus For Power Management Associated With a Switch Fabric" (43 pgs).

Office Action mailed Mar. 31, 2010 for U.S. Appl. No. 12/350,729 (15 pages).

Office Action mailed May 11, 2011 for U.S. Appl. No. 12/347,680 (15 pages).

Final Office Action mailed Sep. 21, 2010 for U.S. Appl. No. 12/350,729 (17 pages).

Non Final Office Action mailed Apr. 1, 2011 for U.S. Appl. No. 12/350,729 (18 pages).

Final Office Action mailed Nov. 1, 2011 for U.S. Appl. No. 12/347,680 (13 pages).

Office Action mailed May 10, 2011 for U.S. Appl. No. 12/347,688 (13 pages).

Office Action mailed Oct. 13, 2011 for U.S. Appl. No. 12/347,688 (14 pages).

Final Office Action mailed Feb. 13, 2012 for U.S. Appl. No. 12/347,688 (16 pages).

Final Office Action mailed Oct. 25, 2011 for U.S. Appl. No. 12/350,729 (26 pages).

* cited by examiner

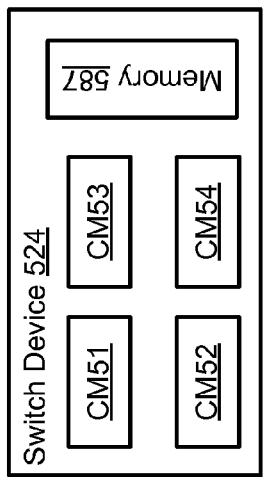
FIG. 5
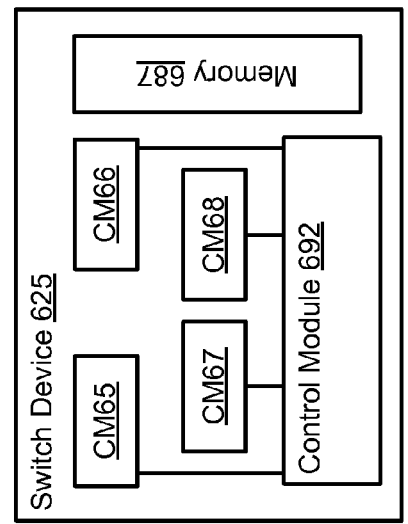
FIG. 6
FIG. 7

DYNAMIC FABRIC PLANE ALLOCATION FOR POWER SAVINGS

BACKGROUND

One or more embodiments relate generally to dynamic power management within a distributed network switch including a group of network switching portions. More specifically, one or more embodiments relate to monitoring utilization and/or capacity parameters of one or more switching portions within a distributed network switch and dynamically activating and/or deactivating communication at one or more of the switching portions to dynamically manage the power consumption within the distributed network switch.

Known methods of communications network power management of network switches implement power management at the individual network switches. Power management of network switches within a communications network is typically limited to minor variations in the operational state of each individual network switch because each network switch within a communications network is typically managed or maintained by distributed protocols such as spanning tree and distributed routing protocols and have limited information related to the operational state of the other network switches within the communications network. Thus, the network switches within the communications network are typically unable to efficiently manage power consumption within the communications network.

SUMMARY

In one embodiment, a method includes accessing a first utilization value, accessing a second utilization value, defining a third utilization value, and sending to a first switching portion of a distributed network switch a deactivate signal in response to the third utilization value. The first utilization value is associated with the first switching portion of the distributed network switch. The second utilization value is associated with a second switching portion of the distributed network switch. The third utilization value is associated with the second switching portion of the distributed network switch and is based on the first utilization parameter and the second utilization parameter. The first switching portion of the distributed network switch ceases communication within the distributed network switch in response to the deactivate signal.

BRIEF DESCRIPTION OF THE DRAWINGS

FIG. 5 is a schematic block diagram of a switch device, according to an embodiment.

FIG. 6 is a schematic block diagram of a switch device, according to another embodiment.

FIG. 7 is a schematic block diagram of a memory including a table configured to store state information related to switching portions of a distributed network switch, according to an embodiment.

DETAILED DESCRIPTION

Figure 1:
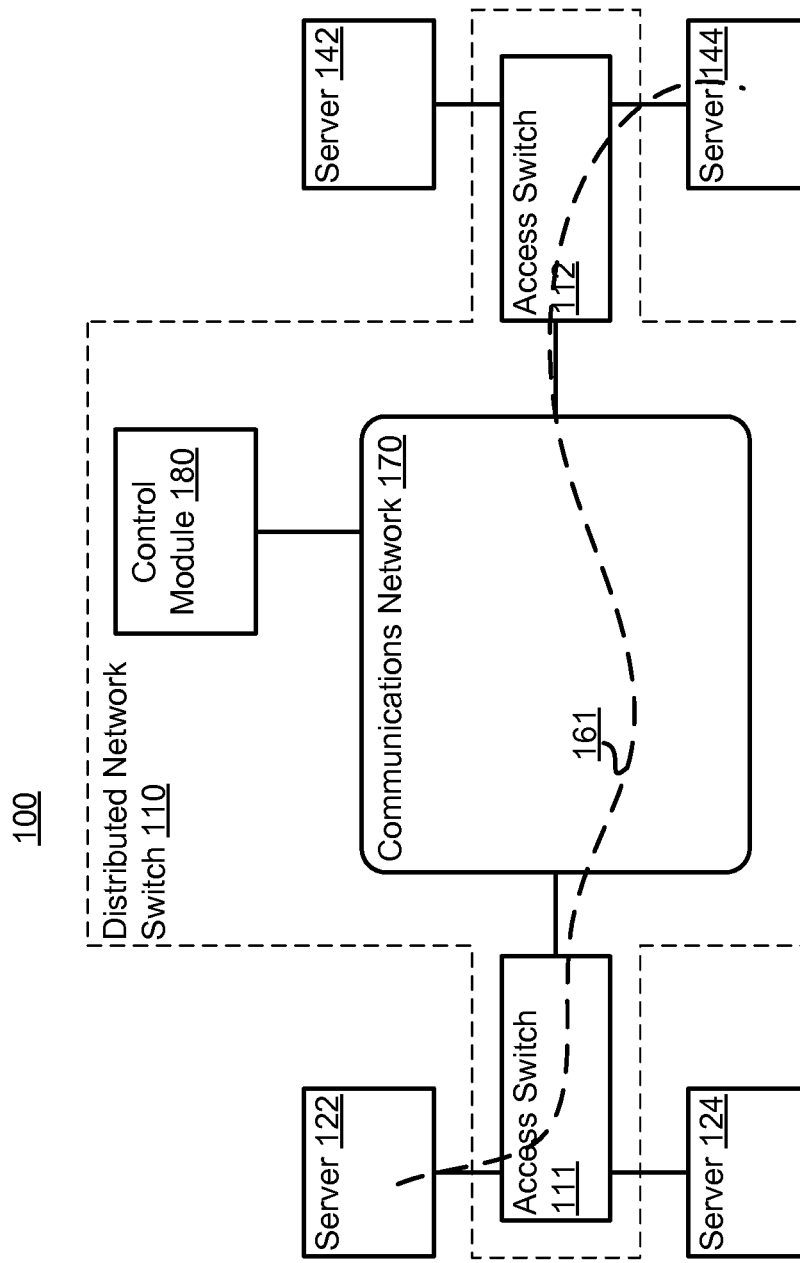
FIG. 1 is a schematic block diagram of a distributed network switch and a group of servers, according to an embodiment.

One or more embodiments can provide dynamic power management within a communications network such as a distributed network switch. A distributed network switch can be a portion of a communications network that is configured to switch or route data (e.g., via data packets, data streams, data cells and/or virtual circuits) within the communications network. A distributed network switch can include multiple switch modules each with one or more switch devices that switch or route data within the distributed network switch. For example, a switch module can be a switch chassis including multiple switch devices such as line cards. Each line card can include multiple communication modules that communicate (e.g., send and/or receive electrical and/or optical signals representing data symbols) with other communication modules at line cards of other switch chassis and/or that same switch chassis.

A distributed network switch can include multiple stages. For example, a distributed network switch can include edge devices such as access switches that are configured to communicate with computing devices such as computer servers (e.g., web servers, database servers, file servers, storage devices and/or other computer servers) and a single-hop core of the distributed network switch. An access switch can receive data from a source computer server connected to that access switch and can forward that data to the single-hop core of the distributed network switch. The single-hop core of the distributed network switch can route or switch the data to another access switch, which can forward the data to a destination computer server connected to that access switch. In some embodiments, an access switch can switch or route data from a source computer server to a destination computer server without forwarding the data to the single-hop core of the distributed network switch if both the source computer server and the destination computer server are connected to that access switch.

In some embodiments, a distributed network switch can include access switches (as discussed above) that are connected to a multistage switch fabric. Data received from source computer servers connected to the access switches can be forwarded to the multistage switch fabric, and the multistage switch fabric can switch or route the data to other access switch to be forwarded to destination computer servers. In some embodiments, an access switch can switch or route data from a source computer server to a destination computer server without forwarding the data to the switch fabric of the distributed network switch if both the source computer server and the destination computer server are connected to that access switch.

In some embodiments, a distributed network switch can include multiple stages. For example, a distributed network switch can include edge devices such as access switches that are configured to communicate with computing devices such as computer servers (e.g., web servers, database servers, file servers, storage devices and/or other computer servers) and aggregation and/or core stages of the distributed network switch. An access switch can receive data from a source computer server connected to that access switch and can forward that data to the aggregation and/or core stages of the distributed network switch. The aggregation and/or core stages of the distributed network switch can route or switch the data to another access switch, which can forward the data to a destination computer server connected to that access switch. In some embodiments, an access switch can switch or route data from a source computer server to a destination computer server without forwarding the data to aggregation and/or core stages of the distributed network switch if both the source computer server and the destination computer server are connected to that access switch.

Dynamic power management can include altering an operational state of one or more switching portions (or elements) of a distributed network switch. For example, dynamic power management can include altering (e.g., increasing or decreasing) a symbol rate at two switch portions of a distributed network switch that are operatively coupled via a link (e.g., an electrical or optical connection) to alter an amount of electrical power consumed (or used) by those two switching portions of the distributed network switch. More specifically, for example, the switching portions can be electrical and/or optical communication modules including transmitter, receiver and/or transceiver modules such as serializers/deserializers ("SerDeses") and optical modules including XFP, SFP+, QSFP, CXP and/or other (e.g., standard, custom or application-specific) single-lane or multi-lane optical modules. Reducing the symbol rate (e.g., a bit rate) at which the two switching portions of the distributed network switch communicate via the link typically reduces the amount of electrical power consumed by the two switching portions. Conversely, increasing the symbol rate (e.g., a bit rate) at which the two switching portions of the distributed network switch communicate via the link typically increases the amount of electrical power consumed by the two switching portions. For links implemented using parallel optical modules that can transmit and/or receive multiple optical lanes over a parallel optical cable or multiple wavelengths of light (e.g., electromagnetic radiation) over a single fiber, reducing the number of active optical lanes through which the two switching portions of the distributed network switch communicate via the link typically reduces the amount of electrical power consumed by the two switching portions. Conversely, increasing the number of active optical lanes through which the two switching portions of the distributed network switch communicate via the link typically increases the amount of electrical power consumed by the two switching portions. As used herein, a switching portion of a distributed network switch can be a switch module (e.g., a chassis including multiple switch devices), a switch device (e.g., a line card within a chassis), a communication module, physical or logical links or channels of a communication module, and/or other components or elements of a distributed network switch.

Furthermore, dynamic power management (e.g., altering an operational state of one or more switching portions (or elements) of a distributed network switch) can include disabling and/or enabling one or more switching portions of the distributed network switch during operation of the distributed network switch. For example, a communication module can communicate with another communication module using a coding protocol such as a differential coding protocol in which the communication modules send symbols in a regular pattern even when no data is being communicated from one communication module to another. These communication modules consume or use electrical power even when they are not transmitting data. Accordingly, disabling these communication modules when they are unused within a distributed switch network can result in decreased power consumption within the distributed network switch. When these communication modules can be used within the distributed network switch, they can be enabled. Thus, power consumption can be dynamically managed within the distributed network switch.

In one embodiment, a distributed network switch includes (or is operatively coupled to) a control module. The control module monitors various operational parameters of the switching portions of the distributed network switch and provides control signals and/or control commands to the switching portions of the distributed network switch. For example, the control module can monitor operational parameters including: current total capacity (e.g., an amount of data that can be transferred in a given time) of the distributed network switch and each switching portion of the distributed network switch; current utilization (e.g., used capacity) of the distributed network switch and of the distributed network switch and each switching portion of the distributed network switch; current available capacity (e.g., unused capacity) of the distributed network switch and each switching portion of the distributed network switch; and/or historic total capacity, utilization, and/or available capacity of the distributed network switch and each switching portion of the distributed network switch. Additionally, the control module can provide control commands to switching portions of the distributed network switch such as: switching or routing parameters (e.g., rules for routing data); availability or state information (e.g., disabled, enabled, partially operational, capacity, utilization, etc.) related to switching portions of the of the distributed network switch; disable or enable commands; increase or decrease symbol rate commands; and/or other control commands.

The control module can dynamically manage the power used by the distributed network switch by determining which switching portions of the distributed network switch can be disabled, enabled, have an increased or decreased symbol rate, and/or have some other operational state altered based on the operational parameters monitored by the control module, and then altering those operational states. Because the control module can access operational parameters of the switching portions of the distributed network switch, the control module can determine which operational states of switching portions can be altered and what effect such alteration will have on other switching portions. Accordingly, the control module can alter operational states of the other switching portions to enable the distributed network switch to continue to operate properly after altering operational states of one or more switching portions.

For example, the control module can determine that a chassis of the distributed network switch has a low current utilization and that utilization of the chassis has been historically low. Furthermore, the control module can determine that three of four access switches coupled to that chassis also have low current utilization. Thus, the control module can send one or more control commands to disable (or deactivate) one or more communication modules at each of the three access switches and at the line cards of the chassis to reduce power consumption of the distributed network switch. Additionally, the control module can send one or more control commands to alter switching or routing tables at switching portions of the distributed network switch to reflect that the disabled communication module are disabled, indicating that switching portions should not send data to or from those communication modules.

Moreover, the control module can detect an increase in the amount or rate of data sent from or to computer servers connected to the three access switches (e.g., by comparing current utilization to historic or previous utilization), and in response can send one or more control commands to enable (or activate) one or more communication modules at each of the three access switches and at the line cards of the chassis to provide sufficient current capacity within the distributed network switch to switch or route the data. After the communication module are enabled, the control module can send one or more control commands to alter switching or routing tables at switching portions of the distributed network switch to reflect that the enabled communication module are enabled, indicating that switching portions may send data to or from those communication modules.

As used in this specification, the singular forms "a," "an" and "the" include plural referents unless the context clearly dictates otherwise. Thus, for example, the term "a switch module" is intended to mean a single switch module or multiple switch modules; and "memory" is intended to mean one or more memories, or a combination thereof.

FIG. 1 is a schematic block diagram of a distributed network switch and a group of servers, according to an embodiment. Access switches 111 and 112 and communications network 170 are switching portions of distributed network switch 110. Control module 180 is a control module operatively coupled to (or associated with) distributed network switch 110. Servers 122 and 124 and servers 142 and 144 are operatively coupled to access switches 111 and 112, respectively. Servers 122, 124, 142 and 144 can communicate data with one another (e.g., send data packets, data cells, data stream and/or other data) via distributed network switch 110. In some embodiments, distributed network switch can be operatively coupled to another communications network such as an intranet or internet via a gateway, bridge, router, switch or other network device (not shown). For example, distributed network switch 110 can be operatively coupled to the Internet via a gateway (not shown) that is operatively coupled to access switch 111; servers 122, 124, 142 and 144 can communicate with computing devices via distributed network switch 110 and the gateway.

As illustrated in FIG. 1, servers 122, 124, 142 and 144 can communicate with one another via access switches 111 and 112 and communications network 170. Communications network 170 can be any communications network configured to transmit data between multiple network device (e.g., switching portions such as access switches 111 and 112). For example, communications network 170 can be an Ethernet network including edge devices, aggregation switches and one or more core switches. In some embodiments, communications network 170 can be a multistage switch fabric, a single-hop core, and/or some other communications network.

Figure 2:
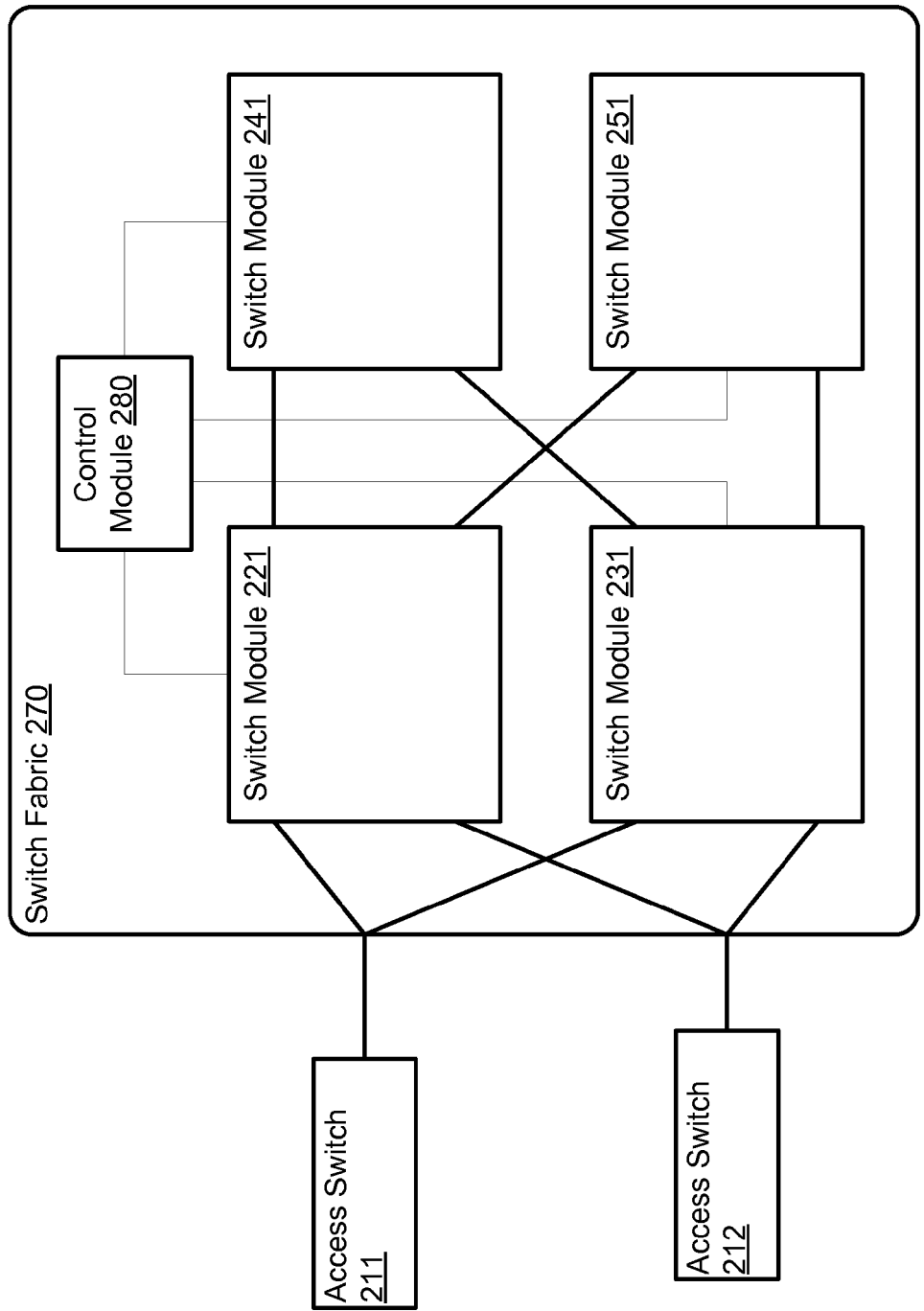
FIG. 2 is a schematic block diagram of a distributed network switch including a switch fabric and a group of access switches, according to an embodiment.

FIG. 2 is a schematic block diagram of distributed network switch 200 including switch fabric 270 and access switches 211 and 212, according to an embodiment. Access switches 211 and 212 in FIG. 2 are analogous to access switches 111 and 112 in FIG. 1. Similarly, control module 280 is analogous to control module 180 (discussed in more detail herein below) and is included as a portion of switch fabric 270. Switch fabric 270 is a communications network. More specifically, switch fabric 270 is a multistage switch fabric including parallel or redundant links to each of access switches 211 and 212. In some embodiments, switch fabric 270 can be based on a Clos network architecture (e.g., a non-blocking Clos network, a strictly non-blocking Clos network, a Benes network). In some embodiments, a network architecture such as, for example, a Clos network and/or a Benes network can be reconfigurable (e.g., rearrangeable). In some embodiments, switch fabric 270 can include one or more multi-stage switches (not shown) that each include one or more switch fabrics. In some embodiments, switch fabric 270 can be a cell-based switch fabric. In some embodiments, switch fabric 270 can be a packet-based (e.g. Ethernet) switch fabric.

Switch modules 221 and 231 are first-stage and third-stage switch modules, and switch modules 241 and 251 are second-stage switch modules. In other words, data received into switch fabric 270 via access switches 211 and 212 are first forwarded to the first-stage portion of switch modules 221 and/or 231. The data are then forwarded to the switch modules 241 and/or 251, and then to the third-stage portion of switch modules 221 and/or 231. The data are finally forwarded to access switches 211 and/or 212 from the third-stage portion of switch modules 221 and/or 231.

Figure 3:
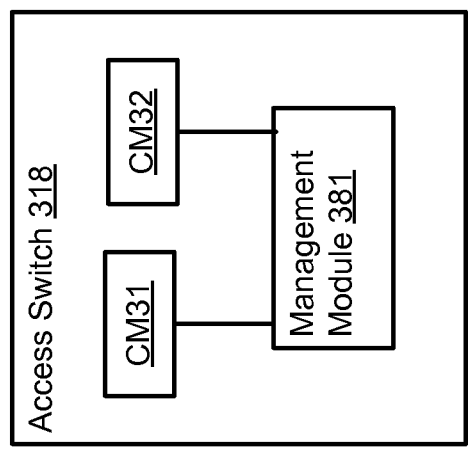
FIG. 3 is a schematic block diagram of an access switch, according to an embodiment.

FIG. 3 is a schematic block diagram of an access switch, according to an embodiment. Access switch 318 includes communication modules CM31 and CM32 and management module 381. Although not illustrated in FIG. 3, access switch 318 also includes a processor and a memory. Communication modules CM31 and CM32 can be electrical and/or optical communication modules including transmitter, receiver and/or transceiver modules such as SerDeses and optical modules including XFP, SFP+, QSFP, CXP and/or other (e.g., standard, custom or application-specific) optical modules. In some embodiments, communication module CM31 can be one type of communication module (e.g., an electrical communication module) and communication module CM32 can be another type of communication module (e.g., an optical communication module). Communication modules CM31 and CM32 can be coupled to communication modules of other switching portions of a distributed network switch and or computing devices. For example, communication module CM31 can be operatively coupled to a network interface card ("NIC") of a computing device via an electrical cable (not shown) and communication module CM32 can be operatively coupled to a communication module at a switch module via an optical cable. A processor (not illustrated) at access switch 318 can process data (e.g., data packet or data cell) received at one of communication modules CM31 and CM32 and forward the data via the other of communication modules CM31 and CM32.

Communication modules CM31 and CM32 can define (or use) one or more physical channels and/or one or more logical channels within (or associated with) each physical channel. For example, communication module CM31 can define (or use) four physical optical channels and each physical optical channel can include four logical channels. Each physical optical channel can be defined by an optical source such as a laser diode and/or an optical receiver. Thus, each physical optical channel can be operatively coupled to another communication module such as, for example, a communication module at a location other than the same access switch (or a physical optical channel of another communication module) via an optical cable. In some embodiments, each physical optical channel can be defined by more than one optical source or optical receiver. Each physical optical channel can be separated into four logical channels using a multiple access scheme such as, for example, a time division multiple access scheme. In some embodiments, multiple logical channels associated with a physical optical channel can be implemented using, multiple laser sources (e.g., an array of vertical-cavity surface-emitting lasers (VCSELs)) and/or multiple optical receivers (e.g. a P-I-N array). For example, signals of a first logical channel within a physical optical channel can be defined by a first laser source, and signals of a second logical channel (parallel with the first logical channel) within the physical optical channel can be defined by a second laser source. The signals of the first logical channel can be received at a first optical receiver and signals of the second logical channel can be received at a second optical receiver. In some embodiments, each optical channel can be separated into two or more logical channels that are each defined, for example, using different wavelengths. In such embodiments, the logical channels can be defined using, for example, wave-division multiplexing (WDM) technology (e.g. coarse wavelength division multiplexing (CWDM) technology, dense wavelength division multiplexing (DWDM) technology).

Management module 381 can be a hardware module such as a processor or a software module hosted at a processor, and is configured to control or manage communication modules CM31 and CM32. For example, management module 381 can alter an operational state of communication modules CM31 and/or CM32. More specifically, management module 381 can enable or disable communication modules CM31 and CM32, increase or decrease a symbol rate of communication modules CM31 and CM32 (that is increase a symbol rate at which data is sent and/or received by communication modules CM31 and CM32), enable or disable one or more physical channels associated with communication modules CM31 and CM32, and/or enable or disable one or more logical channels associated with communication modules CM31 and CM32.

Additionally, management module 381 can monitor, store and/or log operational parameters of access switch 318 (e.g., store current and/or historic operational parameters at a memory) including, for example: current total capacity (e.g., an amount of data that can be transferred in a given time) of access switch 318 and/or communication modules CM31 and CM32; current utilization (e.g., used capacity) of access switch 318 and/or communication modules CM31 and CM32; current available capacity (e.g., unused capacity) of access switch 318 and/or communication modules CM31 and CM32; and/or historic total capacity, utilization, and/or available capacity of access switch 318 and/or communication modules CM31 and CM32. Management module 381 can access the operational parameters to manage access switch 318. For example, management module 381 can alter an operational state of communication modules CM31 and/or CM32 based on one or more operational parameters.

In some embodiments, management module 381 can communicate with a control module of a distributed network switch (e.g., control module 180 of FIG. 1 or control module 280 of FIG. 2). In other words, management module 381 can receive control signals and/or commands from a control module and can send responses to the control module. For example, management module 381 can send operational parameters (or signals representing values of operational parameters) or current operational state information to a control module in response to one or more control commands querying operational parameters of access switch 318 and/or communication modules CM31 and/or CM32. Similarly, management module 381 can send an acknowledge response (e.g., an indication of success, failure, or error) to a control module in response to one or more control commands from the control module indicating that an operational state of access switch 318 and/or communication modules CM31 and/or CM32 should be altered. Thus, the control module can change an operational state of access switch 318 and/or communication modules CM31 and/or CM32. Furthermore, the control module can send one or more control commands indicating an operational state of other switching portions of a distributed network switch to management module 381. Management module 381 can, for example, store information related to the operational state of the other switching portions of the distributed network switch at a memory of access switch 318 (or management module 381) and a processor at access switch 318 or management module 381 (not shown) can access the operational state information to determine whether data should be sent to a particular switching portion or via a particular physical or logical channel.

In some alternative embodiments, the access switch does not include a management module. Rather a control module of a distributed network switch can communicate directly (e.g., not through management module 381) with communication modules (e.g., communication modules CM31 and/or CM32) and/or other components (not shown in FIG. 3) of the access switch to access operational parameters, to access current operational state information, and/or to change an operational state of the access switch, communication modules, and/or other components of the access switch.

Figure 4:
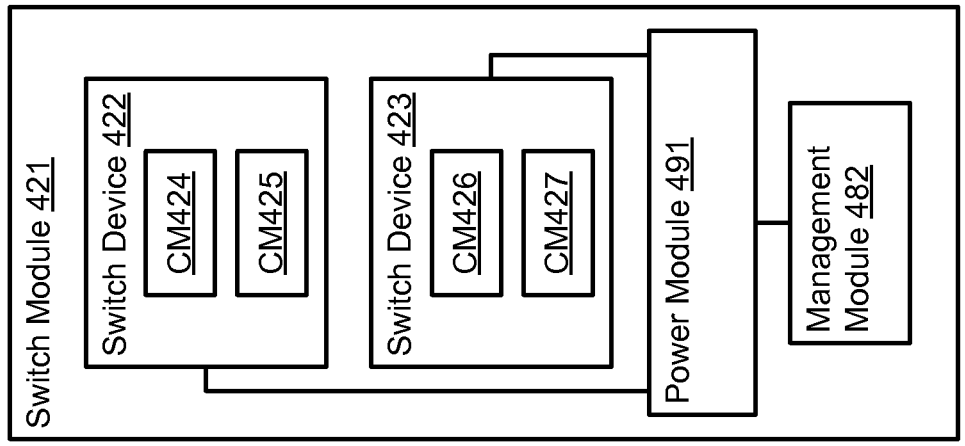
FIG. 4 is a schematic block diagram of a switch module, according to an embodiment.

FIG. 4 is a schematic block diagram of a switch module, according to an embodiment. Switch module 421 includes switch devices 422 and 423, power module 491, and management module 482. Additionally, switch module 421 can include a processor (not shown), a memory (not shown), and/or other components (not shown). Switch devices 422 and 423 can be, for example, line cards and/or other devices within switch module 421 configured to switch and/or route data within a distributed network switch including switch module 421. For example, switch devices 422 and 423 can include communication modules and a processor configured to switch or route data within a distributed network switch.

FIG. 5 is a schematic block diagram of a switch device, according to an embodiment. Switch device 524 includes communication modules CM51, CM52, CM53 and CM54, and memory 587. Additionally, switch device 524 can include a processor (not shown) and/or other components (not shown) operatively coupled to one or more of communication modules CM51, CM52, CM53 and CM54 and memory 587.

Communication modules CM51, CM52, CM53 and CM54 are similar to communication modules CM31 and CM32 discussed above in relation to FIG. 3, and can be operatively coupled to communication modules of an access switch or another switch device to establish a link (or communication link) between switch device 524 and the access switch or other switch device. Said differently, communication modules CM51, CM52, CM53 and/or CM54 can be coupled to other communication modules such as communication modules outside switch device 524 via a cable (e.g., an electrical cable or an optical cable) to define one or more physical and/or logical channels between switch device 524 and one or more access switches and/or other switch devices within a distributed switch network.

Memory 587 can store data or information related to an operational state of other communication modules to which communication modules CM51, CM52, CM53 and/or CM54 are operatively coupled. For example, memory 587 can include a table with entries corresponding to (or associated with) the communication modules to which communication modules CM51, CM52, CM53 and/or CM54 are operatively coupled. In some embodiments, the entries of the table can correspond to operational states of other switching portions, physical channels, logical channels, and/or other links. A processor (not shown) at switch device 524 can access an entry at memory 587 to determine whether data can be sent to or received from a particular communication module or via a particular physical or logical channel based on a value of that entry. FIG. 7 is a schematic block diagram of a memory including a table configured to store state information related to switching portions of a distributed network switch, according to an embodiment. Memory 787 is an example of memory 587.

Table 61 of memory 787 includes entries with values representing an operational state (indicated in column 712) of a communication module (or other switching portion) to which each of communication modules CM51, CM52, CM53 and CM54 (indicated in column 711) of FIG. 5 is operatively coupled. The top-most entry of column 712 corresponds to the communication module operatively coupled to communication module CM51 as indicated by the identifier ID CM51 in column 711. Proceeding downward, the next entry in column 712 corresponds to the communication module operatively coupled to communication module CM52 as indicated by the identifier ID CM52 in column 711; the next entry corresponds to the communication module operatively coupled to communication module CM53 as indicated by the identifier ID CM53 in column 711; and the final entry corresponds to the communication module operatively coupled to communication module CM54 as indicated by the identifier ID CM54 in column 711. Thus, the communication modules respectively operatively coupled to communication modules CM51, CM52 and CM54 are active (or enabled), and the communication module operatively coupled to communication module CM53 is inactive (or disabled). Accordingly, a processor (not shown) at switch device 524 can access table T61 to determine that data should not be sent (or received) via communication module CM53.

In some embodiments, an access switch or switch module can include a memory similar to memory 787 to store operational states of communication modules or other switching portions of a distributed network switch to which that access switch or switch module is operatively coupled. In some embodiments, table T61 includes a single column with entries having values representing an operational state of a communication module to which each of a group of communication modules is operatively coupled. The location or index of each entry can implicitly indicate to which control module that entry is related. For example, the first entry can be related to one communication module, the second entry can be related to another communication module, and the last entry can be related to yet another communication module.

FIG. 6 is a schematic block diagram of another switch device, according to an embodiment. Switch device 625 is similar to switch device 524 illustrated in FIG. 5. For example, communication modules CM65, CM66, CM67 and CM68 are similar to communication modules CM51, CM52, CM53 and CM54, and memory 687 is similar to memory 587. Switch device 625 includes management module 692, which is similar to management module 381 discussed above in relation to FIG. 3.

More specifically, management module 692 can be a hardware module such as a processor or a software module hosted at a processor and is configured to control or manage switch device 625 and/or communication modules CM65, CM66, CM67 and/or CM68. For example, management module 692 can alter an operational state of communication modules CM65, CM66, CM67 and/or CM68. In other words, management module 692 can, for example, enable or disable communication modules CM65, CM66, CM67 and/or CM68, increase or decrease a symbol rate of communication modules CM65, CM66, CM67 and/or CM68 (e.g., a symbol rate at which data is sent and/or received by communication modules CM65, CM66, CM67 and/or CM68), enable or disable one or more physical channels associated with communication modules CM65, CM66, CM67 and/or CM68, enable or disable one or more logical channels associated with communication modules CM65, CM66, CM67 and/or CM68, and/or update entries at memory 687 associated with other switching portions of a distributed network switch, physical or logical channels, and/or other entries. Additionally, management module 692 can monitor, store and/or log operational parameters of switch device 625 (e.g., store current and/or historic operational parameters at a memory such as memory 687). Furthermore, management module 692 can communicate with a control module of a distributed network switch and/or management modules of a switch module (e.g., a switch module within which switch device 625 is housed or hosted).

Returning to FIG. 4, management module 482 is operatively coupled to power module 491 and switch devices 422 and 423. Power module 491 is operatively coupled to switch devices 422 and 423. Management module 482 is similar to management module 381 discussed in relation to FIG. 3 and management module 692 discussed in relation to FIG. 6. More specifically, management module 482 can be a hardware module such as a processor or a software module hosted at a processor and is configured to control or manage switch devices 422 and/or 423 (e.g., communication modules of switch devices 422 and/or 423). For example, management module 482 can alter an operational state of switch devices 422 and/or 423 (e.g., communication modules of switch devices 422 and/or 423). In other words, management module 482 can, for example, enable or disable switch devices 422 and/or 423 (e.g., communication modules of switch devices 422 and/or 423), increase or decrease a symbol rate of data sent and/or received by switch devices 422 and/or 423 (e.g., sent by communication modules of switch devices 422 and/or 423), enable or disable one or more physical channels associated with communication modules switch devices 422 and/or 423 (e.g., communication modules of switch devices 422 and/or 423), enable or disable one or more logical channels associated with switch devices 422 and/or 423 (e.g., communication modules of switch devices 422 and/or 423), and/or update entries associated with other switching portions of a distributed network switch, physical or logical channels, and/or other entries at a memory (not shown) of switch module 421 and/or switch devices 422 and/or 423. Additionally, management module 482 can monitor, store and/or log operational parameters of switch module 421 and/or switch devices 422 and/or 423 (e.g., store current and/or historic operational parameters at a memory). Furthermore, management module 482 can communicate with a control module of a distributed network switch and/or management modules of switch devices 422 and/or 423.

Moreover, management module 482 can provide control commands and/or control signals to power module 491. Power module 491 can be a power supply such as a transformer or DC-DC converter that provides operational power to switch devices 422 and 423. Management module 482 can provide control commands and/or control signals to power module 491 to enable and/or disable operational power to one or more of switch devices 422 and/or 423. For example, if management module 482 determines (e.g., based on operational parameters of switch module 421 and/or switch devices 422 and/or 423, or in response to a control command from a control module of a distributed network switch) that switch device 422 should be disabled, management module 482 can send a control signal (e.g., change a voltage or logic level of a control pin) to power module 491 to disable operational power output to switch device 422. Similarly, if management module 482 determines that switch device 422 should be enabled, management module 482 can send a control signal to power module 491 to enable operational power output to switch device 422. In some embodiments, power module 491 can provide more granular power management. For example, power module 491 can separately provide power to each component (e.g., communication module) of switch devices 422 and 423. Thus, management module 482 can provide control signals and/or control commands to power module 491 to enable, disable, or otherwise alter power output to individual components of switch devices 422 and 423 and/or to switch devices 422 and 423.

In some alternative embodiments, the switch module does not include a management module. Rather a control module of a distributed network switch can communicate directly (e.g., not through management module 482) with switch devices, a power module and/or other components (not shown in FIG. 4) of the switch module to access operational parameters, to access current operational state information, and/or to change an operational state of the switch module, the switch devices, the power module, and/or other components of the switch module and/or the switch devices.

Referring now to FIG. 1, data path 161 illustrates a path of data sent from server 122 to server 144. Data is received at access switch 111 from server 122, and access switch 111 forwards the data to communications network 170. Communications network 170 switches or routes the data to access switch 112, and access switch 112 forwards the data to server 144.

In some embodiments, access switches 111 and 112 communicate with servers 122, 124, 142 and 144 via one protocol and/or physical layer, and communicate with communications network 170 via another protocol and/or physical layer. For example, access switches 111 and 112 can communicate with servers 122, 124, 142 and 144 using a data packet protocol, such as the Internet Protocol ("IP"), and with communications network 170 using a cell-based (e.g., fixed length data cells) protocol. Furthermore, the physical layer (e.g., physical connections) between servers 122, 124, 142 and 144 and access switches 111 and 112 can be electrical and the physical layer between access switches 111 and 112 and communications network 170 can be optical. Thus, referring to data path 161, server 122 can send an IP data packet indicating that server 144 is the destination of the data packet to access switch 111. Access switch 111 can receive the IP data packet, separate the data packet into cells, and send the cells to communications network 170. Communications network 170 can switch or route the cells to access switch 112, and access switch 112 can combine (or reassemble) the cells into an IP data packet. Access switch 112 can then forward the IP data packet to server 144.

In some embodiments, access switches 111 and 112 can communicate with servers 122, 124, 142 and 144 and communications network 170 using a common protocol, and switching portions (e.g., stages) within communications network 170 can communicate using a different protocol. Thus, referring again to data path 161, access switch 111 can forward an IP data packet received from server 122 to communications network 170. A switching portion of communications network 170 operatively coupled to access switch 111 can separate the data packet into cells, and the cells can be forwarded to a switching portion of communications network 170 operatively coupled to access switch 112. That switching portion can combine (or reassemble) the cells into an IP data packet, and forward the IP data packet to server 144 via access switch 112. In some embodiments, access switches 111 and 112 can process data received (e.g., data packets) from servers 122, 124, 142 and 144 before that data is provided to communications network 170. For example, access switches 111 and 112 can classify data packets, queue packets at ingress and egress ports, determine switching portions of communications network 170 to which data packets are to be forwarded, mirror packets, perform packet accounting, and/or otherwise process data packets.

Furthermore, in some embodiments, access switches 111 and 112 can communicate with servers 122, 124, 142 and 144 and communications network 170 using a common protocol, and switching portions (e.g., stages) within communications network 170 can communicate using that same protocol. For example, access switches 111 and 112 can communicate with servers 122, 124, 142 and 144 and communications network 170 using an Ethernet protocol, and switching portions (e.g., stages) within communications network 170 can communicate using an Ethernet protocol. In other words, access switches 111 and 112, servers 122, 124, 142 and 144, and switching portions within communications network 170 can all be Ethernet devices.

Control module 180 can be, for example, a computing device (e.g., a computer including a processor and a memory), a processor such as a general-purpose processor, application-specific integrated circuit ("ASIC"), and/or a field-programmable gate array ("FPGA") within communications network 170, and/or a software module hosted at (or operating on) a processor in communication with distributed network switch 110 (or switching portions of distributed network switch 110). Control module 180 is operatively coupled to the switching portions of distributed network switch 110. As illustrated in FIG. 1, control module 180 is connected to communications network 170. Thus, control module 180 can communicate with switching portions of distributed network switch 110 such as access switches 111 and 112 via communications network 170. In other words, control signals and/or control commands can be sent from (and responses received at) control module 180 to switching portions of distributed network switch 110 via communications network 170 via the same communication links (or paths) through which data are switched or routed within distributed network switch 110. For example, control signals and/or control commands can be sent (and responses received) using out-of-band communications within distributed network switch 110. Said differently, control module 180 can be operatively coupled to the switching portions of distributed network switch 110 via a logical control plane. In some embodiments, control module 180 can be physically coupled to the switching portions of distributed network switch 110; said differently, control module 180 can be physically connected to all or some of the switching portions of distributed network switch 110 via a physical control plane. In some embodiments, control module 180 can be physically coupled to (e.g., via the logical control plane) some switching portions of distributed network switch 110 and logically coupled to other switching portions of distributed network switch 110.

Control module 180 can monitor various operational parameters of the switching portions of the distributed network switch and provide control signals and/or control commands to the switching portions (e.g., access switches 111 and 112 and other switching portions of communications network 170) of the distributed network switch. For example, control module 180 can communicate with (e.g., send control command to and/or receive responses from) a switching portion via a management module of that switching portion. In some embodiments, one or more switching portions do not include management modules, and control module 180 can communicate directly with those switching portions.

Control module 180 can monitor operational parameters, for example, at access switches 111 and 112 including: current total capacity (e.g., an amount of data that can be transferred in a given time) of access switches 111 and 112; current utilization (e.g., used capacity) of access switches 111 and 112; current available capacity (e.g., unused capacity) of access switches 111 and 112; and/or historic total capacity, utilization, and/or available capacity of access switches 111 and 112. Additionally, control module 180 can provide control commands to access switches 111 and 112, for example, such as: switching or routing parameters (e.g., rules for routing data); availability or state information (e.g., disabled, enabled, partially operational, capacity, utilization, etc.) related to switching portions of the of distributed network switch 110; disable or enable commands; increase or decrease symbol rate commands; and/or other control commands.

As discussed above, control module 180 can dynamically manage the power used by distributed network switch 110 by determining which switching portions of distributed network switch 110 can be disabled, enabled, have an increased or decreased symbol rate, and/or have some other operational state altered based on the operational parameters monitored by the control module, and then by altering those operational states. Because control module 180 can access operational parameters of the switching portions of distributed network switch 110, control module 180 can determine which operational states of switching portions can be altered and what effect such alteration will have on other switching portions. Accordingly, control 180 module can alter operational states of the other switching portions to enable distributed network switch 110 to continue to operate properly after altering operational states of one or more switching portions.

FIGS. 8A-8E are schematic block diagrams that illustrate communications planes within a distributed network switch, according to an embodiment. Distributed network switch 800 includes access switches AS811-AS818 and switch modules SM821, SM831, SM841 and SM851. Switch module SM821 includes switch devices SD822 and SD823, which include communication modules CM824 and CM825 and communication modules CM826 and CM827, respectively. Switch module SM831 includes switch devices SD832 and SD833, which include communication modules CM834 and CM835 and communication modules CM836 and CM837, respectively. Switch module SM841 includes switch devices SD842 and SD843, which include communication modules CM844 and CM845 and communication modules CM846 and CM847, respectively. Switch module SM851 includes switch devices SD852 and SD853, which include communication modules CM854 and CM855 and communication modules CM856 and CM857, respectively.

The connections between switching portions of distributed network switch 800 can be referred to as links or communication links. Links can be physical or logical channels between communication modules and/or other switching portions, as discussed above. Furthermore, each link can include one or more than one physical and/or logical channel. Thus, each line illustrated in FIGS. 8A-8E representing a link can include multiple channels or communication paths.

Each of access switches AS811-AS818 are operatively coupled to each of switch modules SM821 and SM831 via links 897. Similarly, switch module SM821 is operatively coupled to switch module SM841 via links 898, and switch module SM831 is operatively coupled to switch module SM851 via links 899. The configuration of the switching elements (e.g., access switches, switch modules, switch devices and communication modules and links) of distributed network switch 800 defines multiple redundant or parallel planes of links (or communication planes) via which computer servers or other devices (not shown) operatively coupled to access switches AS811-AS818 can communicate.

Figure 8A:
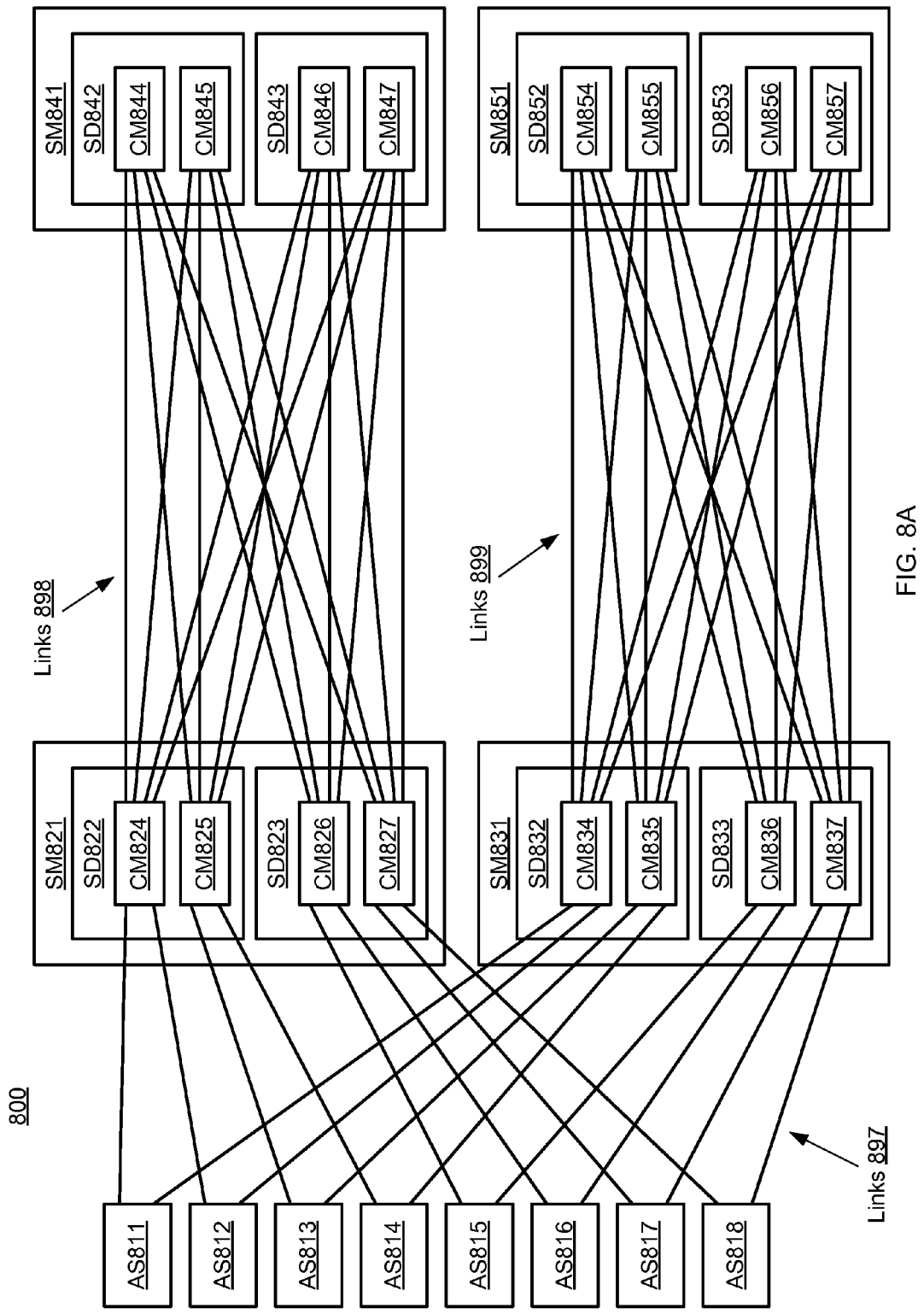
FIGS. 8A-8E are schematic block diagrams that illustrate communications planes within a distributed network switch, according to an embodiment.
Figure 8B:
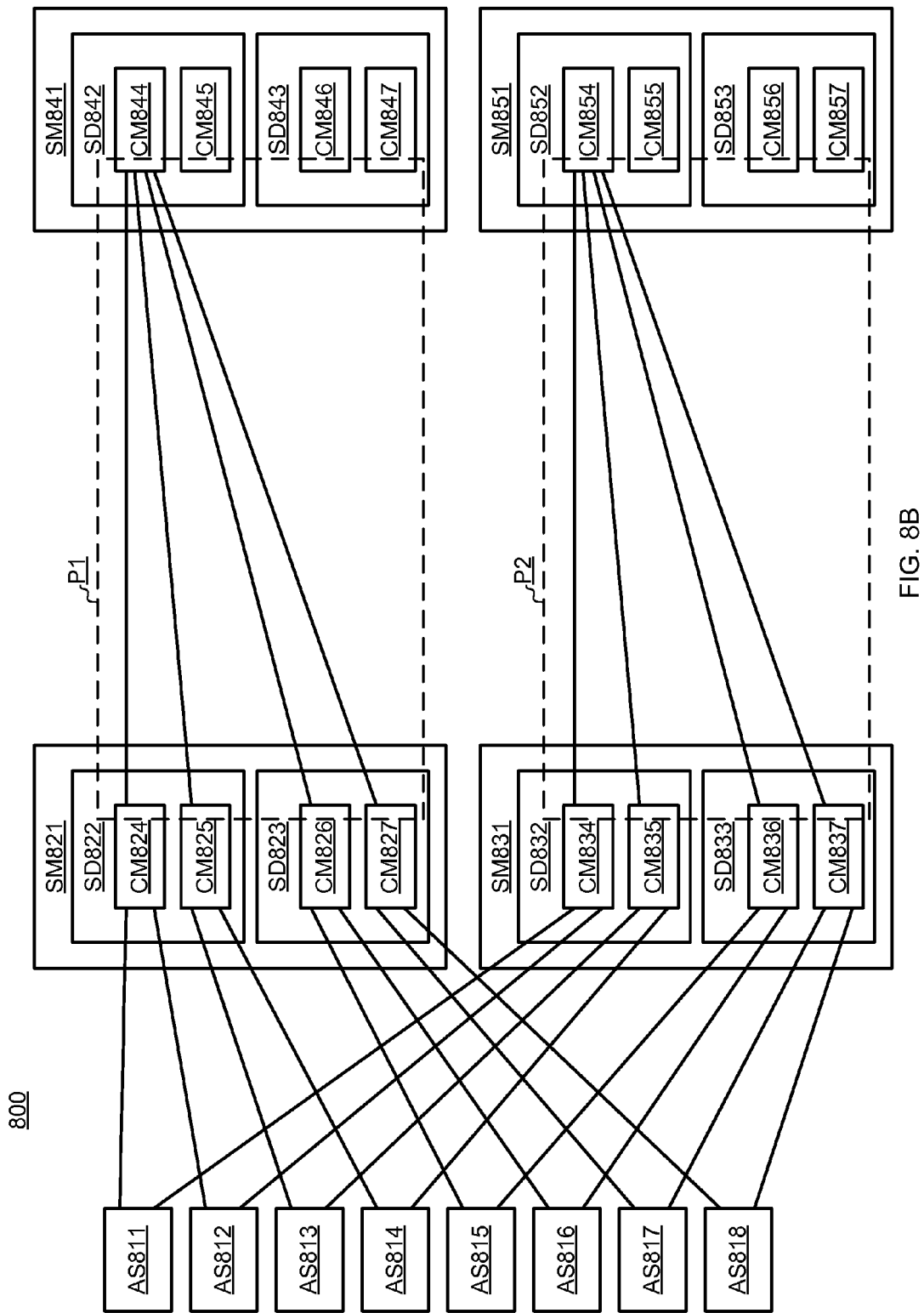

FIGS. 8B-8E illustrate various communication planes of distributed network switch 800, labeled P1-P8. For example, FIG. 8B illustrates planes P1 and P2. Each link between access switches AS811-AS818 and switch module SM831 can be removed, and at least one communication path exists for any computer server or other device (not shown) operatively coupled to one or more of access switches AS811-AS818 via plane P1. That is, a combination of links and switching portions of distributed network switch 800 (e.g., via switch modules SM821 and SM841) exists by which any computer server or other device (not shown) operatively coupled to one or more of access switches AS811-AS818 can communicate with any other computer server or other device (not shown) operatively couple to one or more of access switches AS811-AS818. Similarly, each link between access switches AS811-AS818 and switch module SM821 can be removed, and at least one communication path exists for any computer server or other device (not shown) operatively coupled to one or more of access switches AS811-AS818 via plane P2.

Figure 8C:
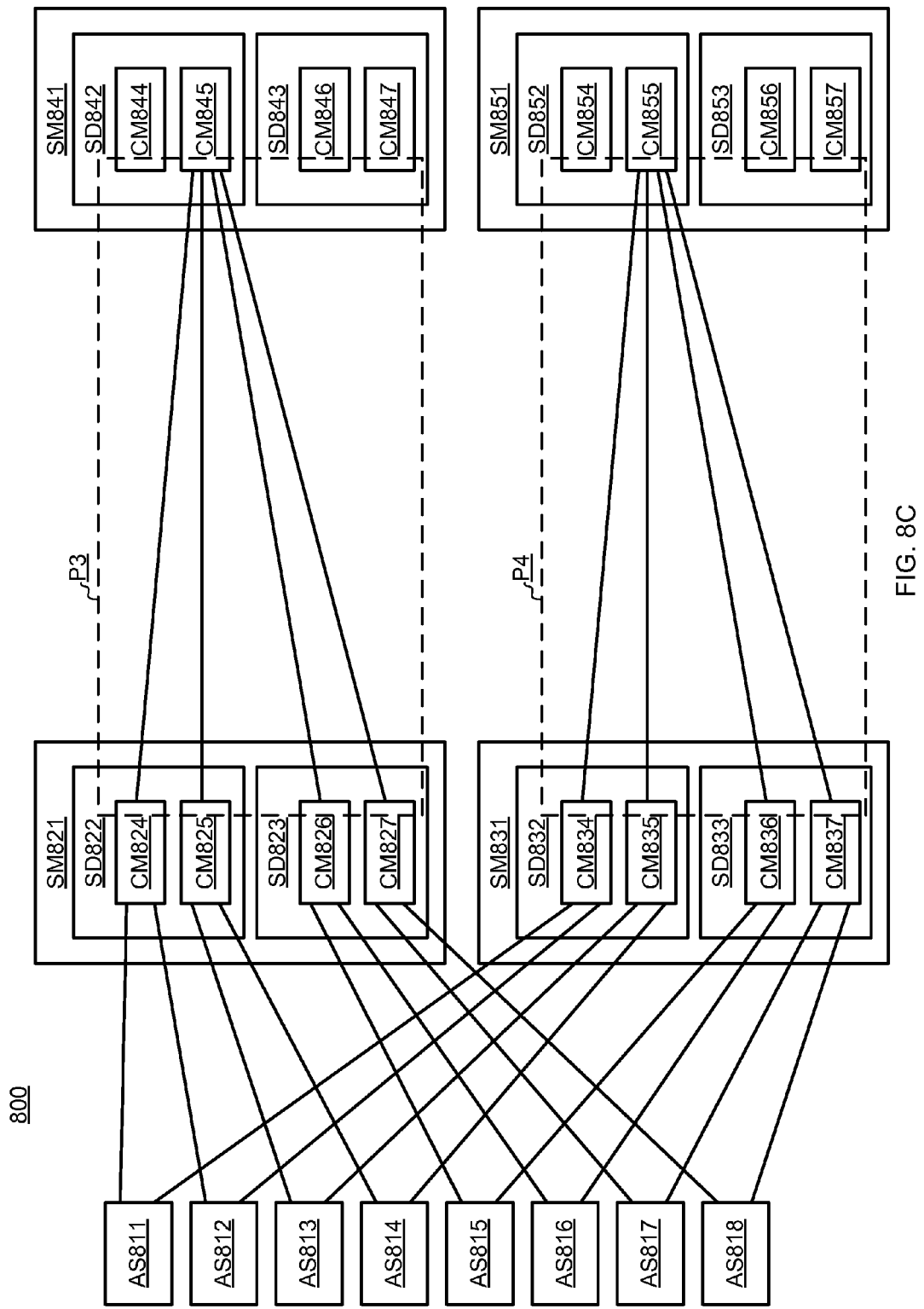
Figure 8D:
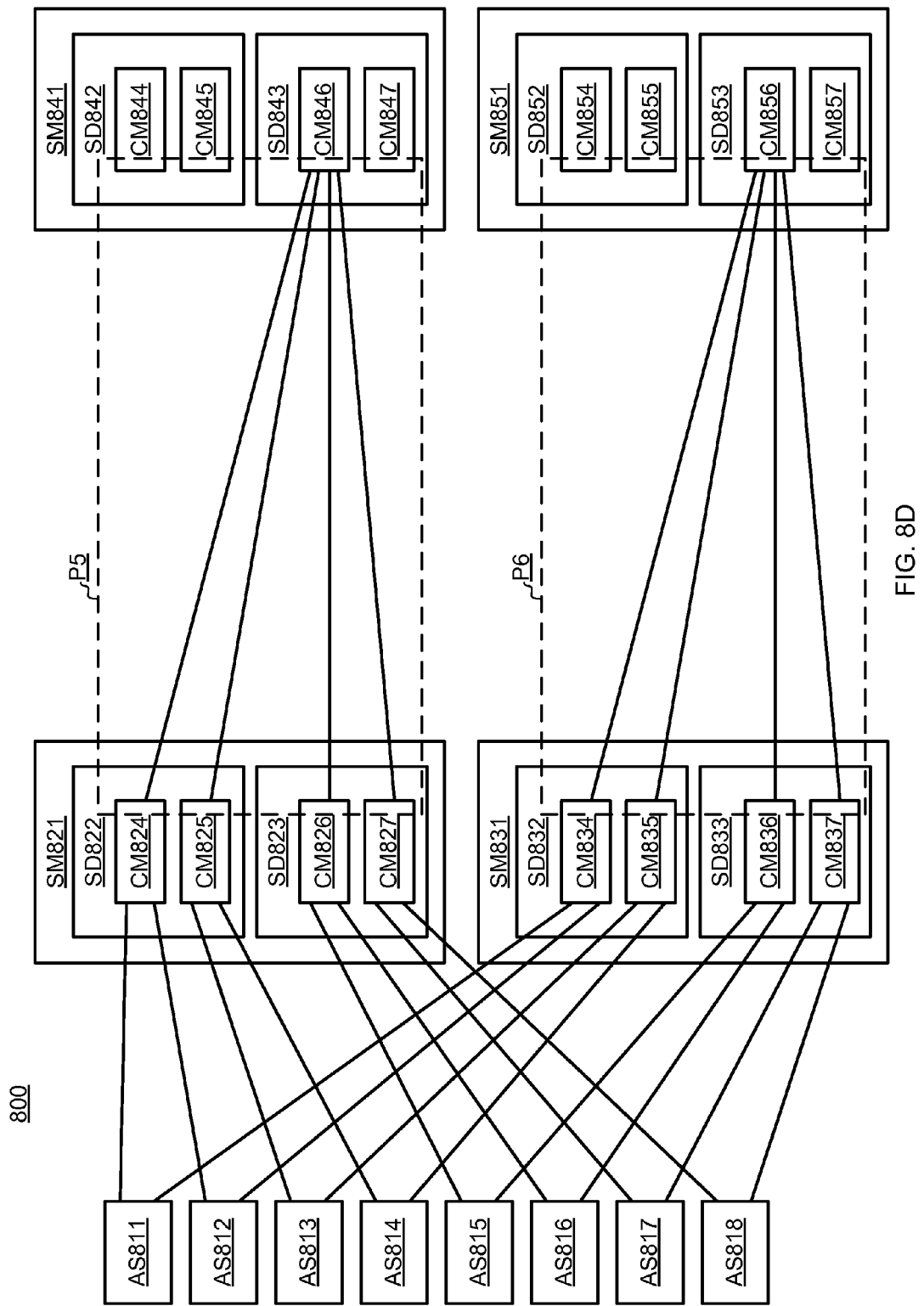
Figure 8E:
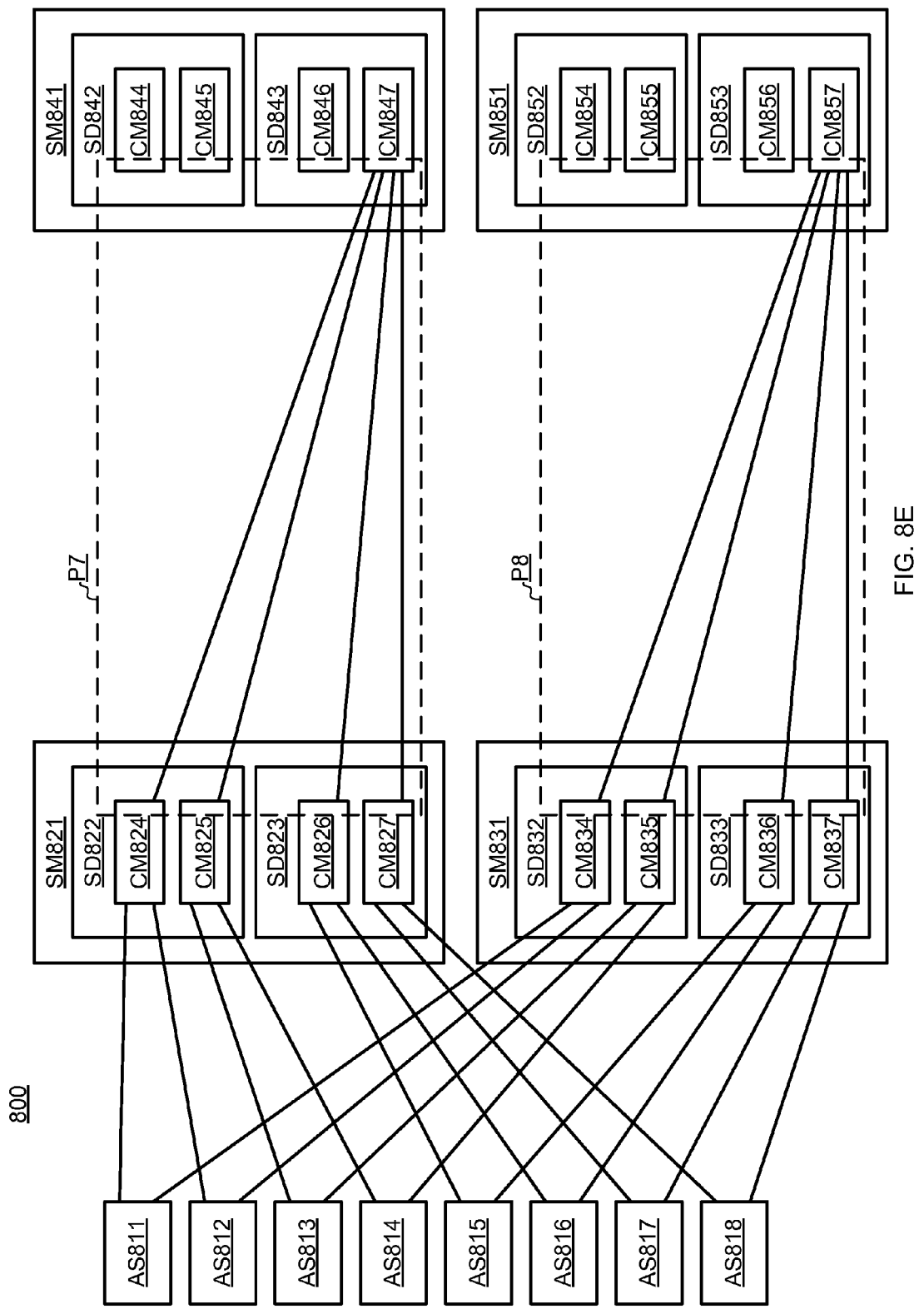

Furthermore, for FIGS. 8C-8E, each link between access switches AS811-AS818 and switch module SM831 can be removed, and at least one communication path exists for any computer server or other device (not shown) operatively coupled to one or more of access switches AS811-AS818 via planes P3, P5 and P7. Moreover, each link between access switches AS811-AS818 and switch module SM821 can be removed, and at least one communication path exists for any computer server or other device (not shown) operatively coupled to one or more of access switches AS811-AS818 via plane P4, P6 and P8.

Because multiple communication planes exist in distributed network switch 800, an operational state of one or more links can be altered, depending on utilization of links or switching portions of distributed network switch 800. The operational state of the link or links can be altered to manage power consumed by distributed network switch 800. In other words, as utilization decreases, switching portions of distributed network switch 800 can be disabled (or taken off-line), for example, by a control module associated with distributed network switch 800 to disable links and reduce power consumption. Similarly, as utilization increases, switching portions of distributed network switch 800 can be enabled (or taken on-line), for example, by a control module associated with distributed network switch 800 to provide additional capacity in (or through) distributed network switch 800, which results in increased power consumption.

As discussed above, switching elements can be enabled or disabled at various granularities: an entire switch module or access switch can be enabled or disabled; a switch device of a switch module can be enabled or disabled; one or more communication modules of an access switch; switch module or switch device can be enabled or disabled; and/or individual physical or logical channels of a communication module can be enabled or disabled. Additionally, symbol rates can be increased or decreased to manage power.

Accordingly, a control module (not shown in FIGS. 8A-8E) associated with distributed network switch 800 can monitor operational parameters of switching portions of distributed network switch 800 and provide control signals and/or control commands to those switching portions to detect and change operational states of those switching portions during operation of distributed network switch 800. Power consumption of distributed network switch 800 can, thus, be varied or managed dynamically during operation of distributed network switch 800 in response to changes in utilization or load of distributed network switch 800.

Figure 9:
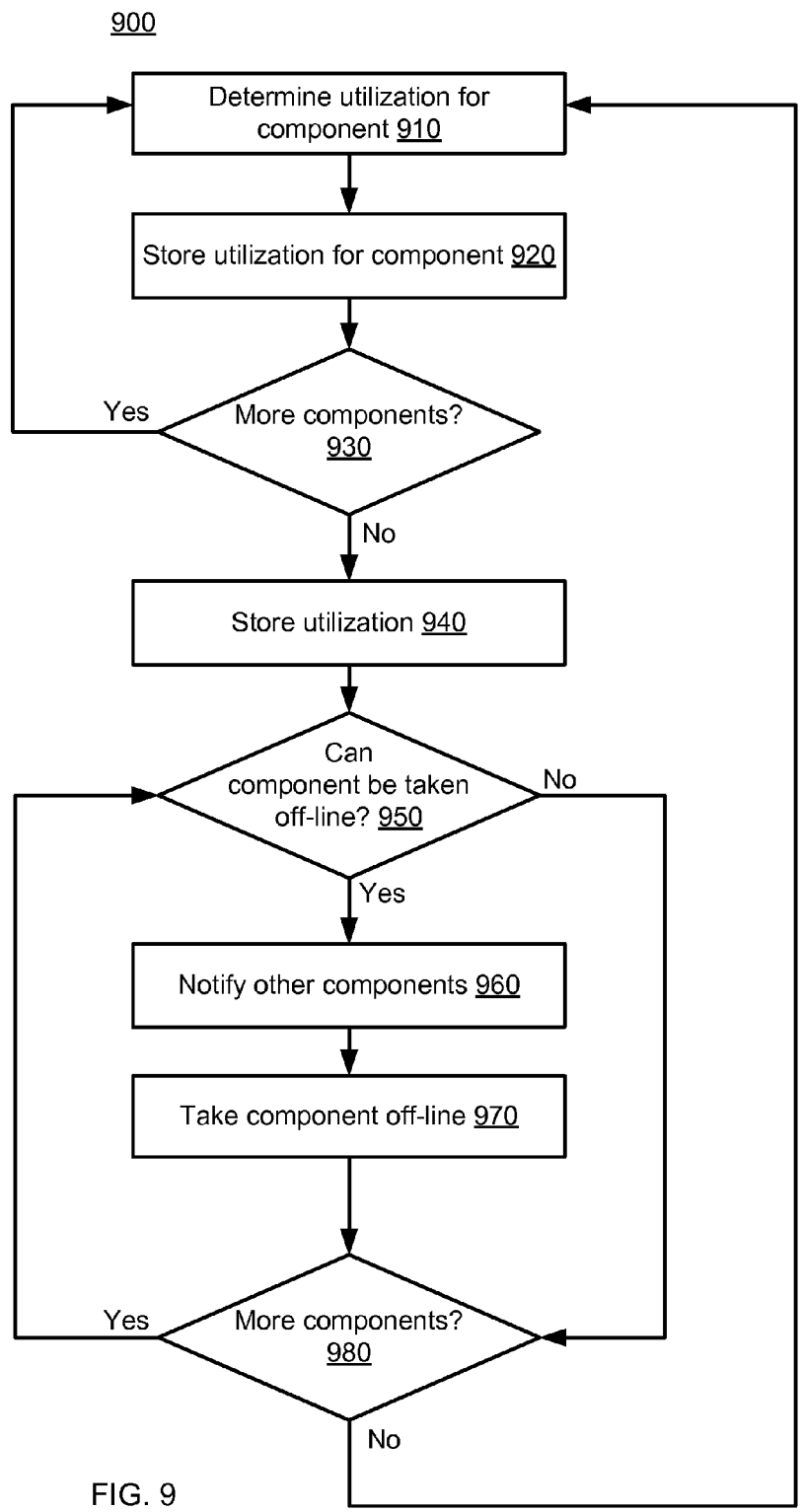
FIG. 9 is a flow chart of a method of disabling a switching portion within a distributed network switch, according to an embodiment.

FIG. 9 is a flow chart of a method of disabling a switching portion within a distributed network switch, according to an embodiment. Method 900 can be implemented, for example, as a software module (e.g., source code, object code, one or more scripts, or instructions) stored at a memory and operable to be executed and/or interpreted or compiled at a processor operatively coupled to the memory at a control module so some other portion of a distributed network switch. For example, processor-executable instructions stored at a memory of a control module can be executed at a processor at the control module to cause the processor to execute the steps of method 900. In some embodiments, method 900 can be implemented as one or more hardware modules such as, for example, an ASIC, an FPGA, a processor, or other hardware module at a control module. In some embodiments, method 900 can be implemented as a combination of one or more hardware modules and software modules at a control module.

Utilization for a component (i.e., a switching portion) of a distributed network switch is determined, at 910. For example, a control module of a distributed network switch can send a control command (e.g., via a control plane such as a logical control plane within a distributed network switch) including a request to access (e.g., read) a value of a utilization operational parameter of a switch device or some other switching portion to a management module operatively coupled to the switch device or directly to the control module. In some embodiments, a component can push (e.g., send) a utilization value to a control module. The utilization value can then be stored, for example, at a memory of or accessible to the control module, at 920. If the distributed network switch includes more components, steps 910 and 920 can be repeated, at 930, for each component of the distributed network switch.

In some embodiments, utilization values are polled (e.g., by a control module) or pushed (e.g., from switching portions to a control module) at constant intervals. For example, utilization values can be requested every 100 ms. In some embodiments, a rate at which utilization values are polled or pushed can be dependant upon (e.g., vary based on) current utilization, past utilization, predicted future utilization, current capacity, past capacity, predicted future capacity, and/or upon other values or parameters associated with one or more switching portions of a distributed network switch and/or with a distributed network switch. For example, a utilization values can be polled or pushed more frequently if current utilization is high.

Furthermore, in some embodiments, a rate at which utilization values are polled or pushed can be dependant upon (e.g., vary based on) a rate of change to one or more values or parameters associated with one or more switching portions of a distributed network switch and/or with a distributed network switch such as a rate of change in one or more utilization values and/or one or more capacity values. For example, utilization values can be polled or pushed more frequently when the rate of change of a utilization value is high such that a control module of a distributed network switch can receive and process utilization values at a sufficient rate to cause the distributed network switch to respond (e.g., change an operational state of one or more switching portions) to variations or changes in network utilization (or traffic) at a rate that is faster than those variations in network utilization. Said differently, a control module can receive utilization values at dynamically varying rates that are sufficiently frequent to allow the control module to adjust capacity in the distributed network switch (e.g., by enabling disabled switching portions) without blocking or disrupting network traffic (e.g., data transmitted through the distributed network switch).

In some embodiments, not every component of a distributed network switch is monitored or managed. In other words, a control module, for example, performing process 900 can determine and/or store utilization values for some components of the distributed network switch, but not for other components of the distributed network switch. Thus, steps 910 and 920 can be performed for some, but not all of the components of a distributed network switch.

After a utilization value has been determined for each component (e.g., each managed component), at 930, the utilization values can be aggregated to determine utilization values for the distributed network switch, at 940. For example, the utilization values for communication modules of a switch device can be aggregated to determine a utilization value for that switch device. Similarly, utilization values for communication modules of an access switch can be aggregated to determine a utilization value for that access switch. Furthermore, utilization values for communication modules that are operatively coupled via a link (e.g., a physical or logical channel between the communication modules) can be aggregated to determine a utilization value for that link. Additionally, utilization values for any other components that are included within other components (e.g., utilization values for switching portions, such as switch devices, that are included in other switching portions, such as switch modules) can be aggregated to determine utilization values for the other components.

Figure 10:
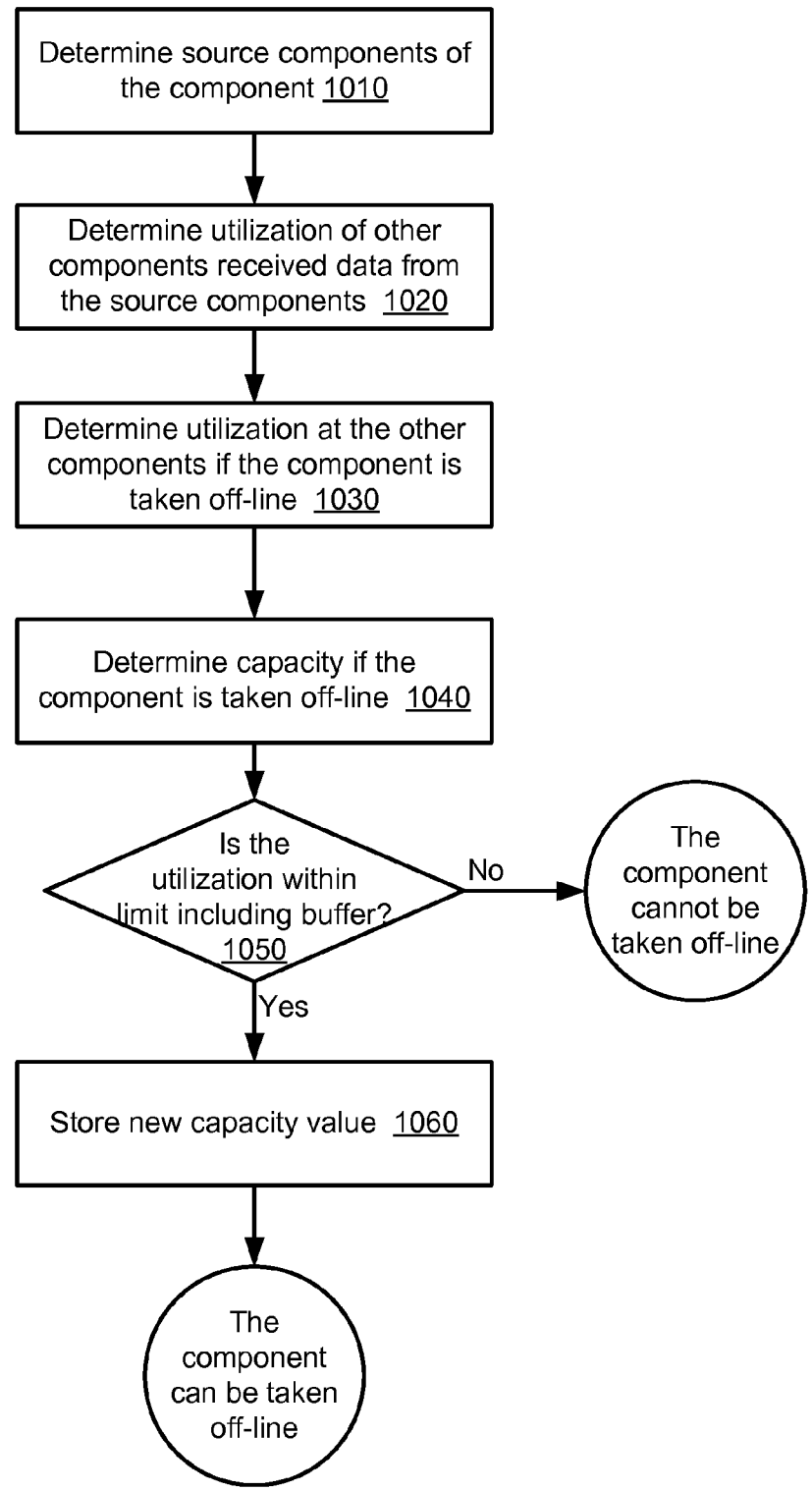
FIG. 10 is a flow chart of a method of determining whether a switching portion within a distributed network switch can be disabled, according to an embodiment.

After utilization values for component(s) are determined (e.g., directly at steps 910, 920 and 930 and/or indirectly at step 940), operational states of the component(s) can be altered, at steps 950, 960, 970 and 980. At 950, a control module implementing method 900, for example, can determine whether a component can be disabled or taken off-line. FIG. 10, for example, is a flow chart of a method of determining whether a switching portion within a distributed network switch can be disabled, according to an embodiment. Method 1000 can be implemented, for example, as a software module (e.g., source code, object code, one or more scripts, or instructions) stored at a memory and operable to be executed and/or interpreted or compiled at a processor operatively coupled to the memory at a control module so some other portion of a distributed network switch. For example, processor-executable instructions stored at a memory of a control module can be executed at a processor at the control module to cause the processor to execute the steps of method 1000. In some embodiments, method 1000 can be implemented as one or more hardware modules such as, for example, an ASIC, an FPGA, a processor, or other hardware module at a control module. In some embodiments, method 1000 can be implemented as a combination of one or more hardware modules and software modules at a control module.

Source components of the candidate component (i.e., the component to which method 1000 is applied) are identified, at 1010. Source components are those components within a distributed network switch from which the candidate component receives data. Thus, at 1010, the components that provide data to the candidate component within the distributed network switch are identified. Similarly, at 1020, other components (i.e., components other than the candidate component) that receive data from the source components are identified. The source components and other components can be identified using a variety of methods. For example, a control module can store at a memory switching or routing information (e.g., tables) associated with each component (i.e., switching portion) of a distributed network switch. The control module can then access this information to determine which components send and/or receive data to and/or from other components. In some embodiments, a control module can query the components using control signals and/or control commands to determine which components send and/or receive data to and/or from other components. For example, a control module can send to a component a control command including a request that that component determine whether that component sends data to a candidate component. Alternatively, a control module can access switching information stored at a memory of a component using, for example, direct memory access ("DMA") via a control plane of the distributed network switch to determine whether that component sends data to a candidate component.

After these components have been identified, utilization values at the other components (i.e., the components other than the candidate component that receive data from the source components) are determined in the absence of the candidate component, at 1030. In other words, utilization values are calculated based on, for example, utilization values of the other components and the candidate component. For example, the utilization value of the candidate component can be divided equally among the other components to estimate the increase in utilization the other component will experience if the candidate component is take off-line (i.e., is disabled).

In some embodiments, a capacity value representing a capacity of the distributed network switch, a component, and/or a collection of components is determined based on the absence of the candidate component, at 1040. Thus, this capacity value represents the capacity or the amount of data the distributed network switch, the component, and/or the collection of components can transmit (or handle) during a time period if the candidate component is taken off-line. If the utilization of the distributed network switch, the component, and/or the collection of components is within a threshold or buffer of the determined capacity, at 1050, the determined capacity value can be stored, at 1060, and the candidate component can be taken off-line. In other words, if capacity of the distributed network switch, the component, and/or the collection of components is greater than the utilization of the distributed network switch, the component, and/or the collection of components by a buffer or threshold, then the component can be taken off-line. If the utilization of the distributed network switch, the component, and/or the collection of components is not within a threshold or buffer of the determined capacity, at 1050, the candidate component cannot be taken off-line. Said differently, if capacity of the distributed network switch, the component, and/or the collection of components is not greater than the utilization of the distributed network switch, the component, and/or the collection of components by a buffer or threshold, then the component cannot be taken off-line.

The threshold can be, for example, an amount of utilization that is based on the current utilization or capacity of the distributed network switch, the component, and/or the collection of components. For example, the threshold can be between 50% and 20% of the current utilization. The threshold provides for sufficient additional capacity in the distributed network switch, the component, and/or the collection of components such that the utilization of the distributed network switch, the component, and/or the collection of components can increase without bringing off-line components on-line. In other words, the threshold maintains a capacity buffer in the distributed network switch, the component, and/or the collection of components such that variations in the utilization (or load or demand) of the distributed network switch, the component, and/or the collection of components do not disrupt operation of the distributed network switch, the component, and/or the collection of components.

Returning to FIG. 9, if it is determined at 950 that the component cannot be taken off-line, method 900 continues to 980, at which it is determined whether there are additional components. If there are additional components, method 900 continues again to 950. If there are no additional components, method 900 continues to 910.

If, however, it is determined at 950 that the component can be taken off-line, other components of the distributed network switch are notified that the component will be taken off-line and/or of changes in the distributed network switch that will result from the component being taken off-line, at 960. A control module of a distributed network switch, for example, implementing method 900 can send control commands to other components of the distributed network switch to notify those components that the component will be take off-line. For example, a control command can include an instruction to update a table within a memory of a component to indicate that the operational state of the component is off-line or disabled. Thus, data will not be sent to the component. In some embodiments, notifying other components can include sending an updated utilization value and/or capacity value (e.g., from a control module via a control command) for one or more components in the distributed network switch to other components.

After other components are notified that the component will be taken off-line, the component is taken off-line, at 970. For example, a control module can send a control command to the component including an instruction to disable operational power to the component. Thus, operational power is saved by disabling the component. In some embodiments, a first portion of operational power is no longer provided to the component, and a second portion of operational power is provided to the component. The first portion of operational power can be for operation of, for example, a communication module such as an optical transceiver, and the second portion of operational power can be for operation of a management module. The management module can continue to operate after the communication module has been disabled such that the management module can enable the communication module at a later time. Method 900 then continues to 980, at which it is determined whether there are additional components. If there are additional components, method 900 continues again to 950. If there are no additional components, method 900 continues to 910.

In some embodiments, methods 900 and/or 1000 can include more or fewer steps than illustrated in FIGS. 9 and 10. For example, method 900 can include initializing a control module with initial utilization and/or capacity values. Additionally, in some embodiments, steps of methods 900 and 1000 can be rearranged. Furthermore, methods 900 and 1000 are applicable to changes in operational state of one or more components other than disabling a component. For example, methods 900 and 1000 are applicable to changing a symbol rate associated with a component and to disabling physical and/or logical channels of a communication module or a link between two communication modules. More over, although methods 900 and 1000 are discussed primarily with reference to a component, these methods are applicable to an entire distributed network switch, multiple components, and/or a group or groups of components.

Figure 11:
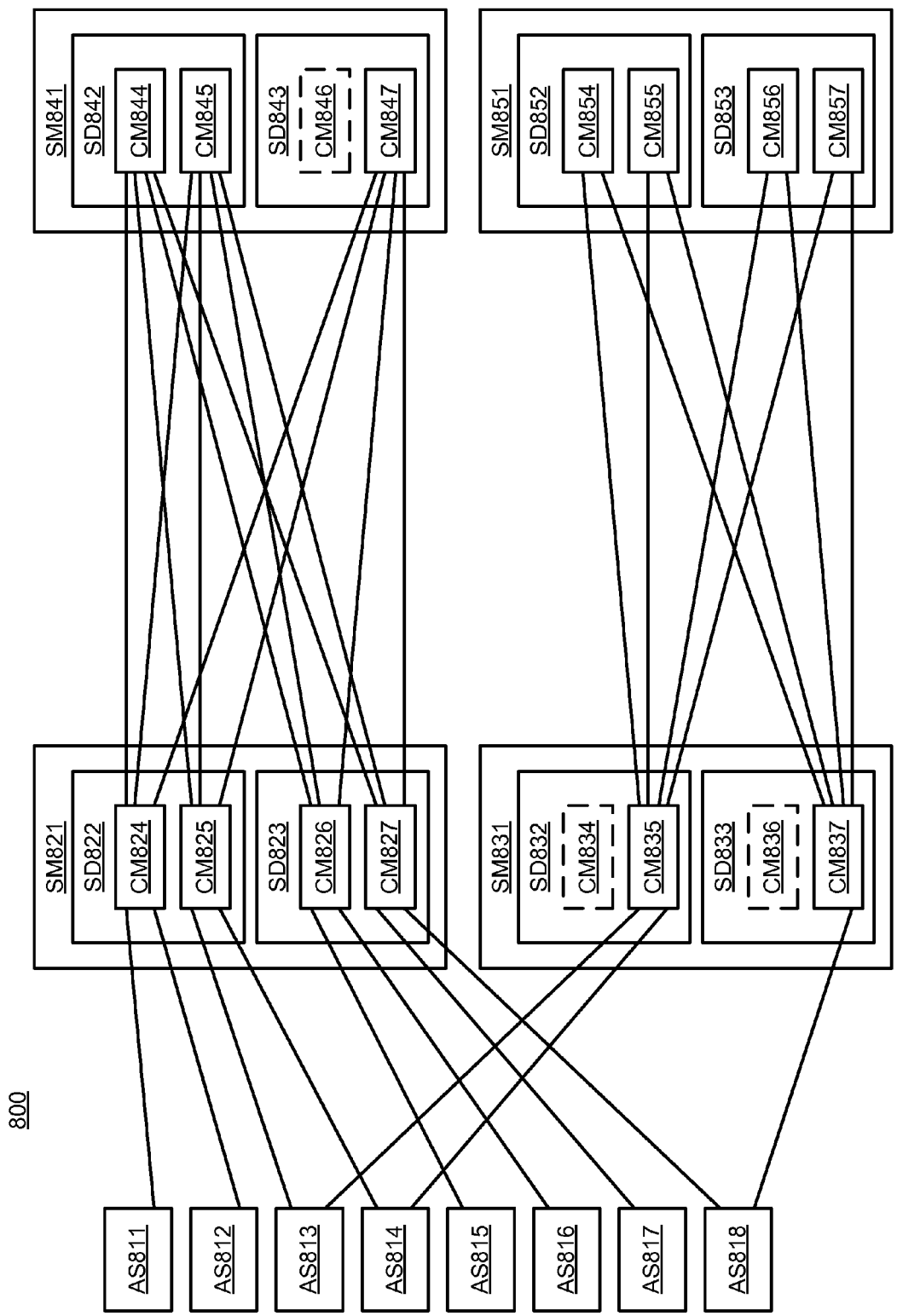
FIG. 11 is a schematic block diagram that illustrates a distributed network switch in which switching portions have been disabled, according to an embodiment.

FIG. 11 is a schematic block diagram that illustrates a distributed network switch in which switching portions have been disabled, according to an embodiment. Distributed network switch 800 (discussed above in relation to FIGS. 8A-8E) is illustrated in FIG. 11 after various switching portions or components of distributed network switch 800 have been disabled. For example, communication modules CM834, CM836 and CM846 have been disabled. Thus, a link associated with a communication module of each of access switches AS811, AS812, AS815, AS816, and AS817 have been disabled. As a result, access switches AS811, AS812, AS815, AS816, and AS817 are illustrated with single rather than redundant paths to switch modules SM821 or SM831. Additionally, links between communication modules CM834, CM836 and CM846 and other communication modules within distributed network switch 800 are no longer active and are not illustrated in FIG. 11.

Figure 12:
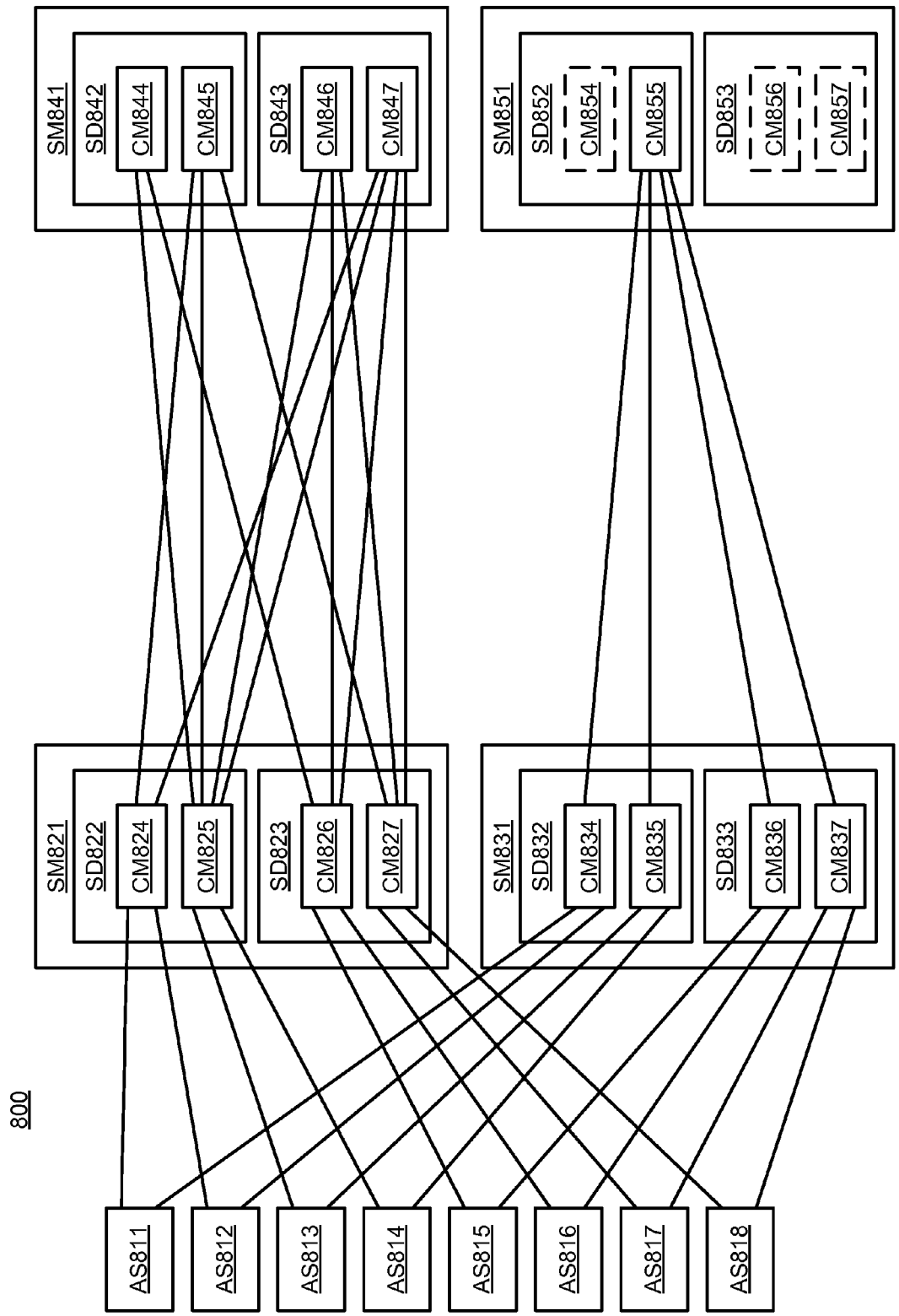
FIG. 12 is a schematic block diagram that illustrates a distributed network switch in which other switching portions have been disabled, according to an embodiment.

Similarly, FIG. 12 is a schematic block diagram that illustrates a distributed network switch in which other switching portions have been disabled, according to an embodiment. For example, communication modules CM854, CM856 and CM857 have been disabled. Thus, links between communication modules CM834, CM836 and CM846 and other communication modules within distributed network switch 800 are no longer active and are not illustrated in FIG. 12.

Figure 13:
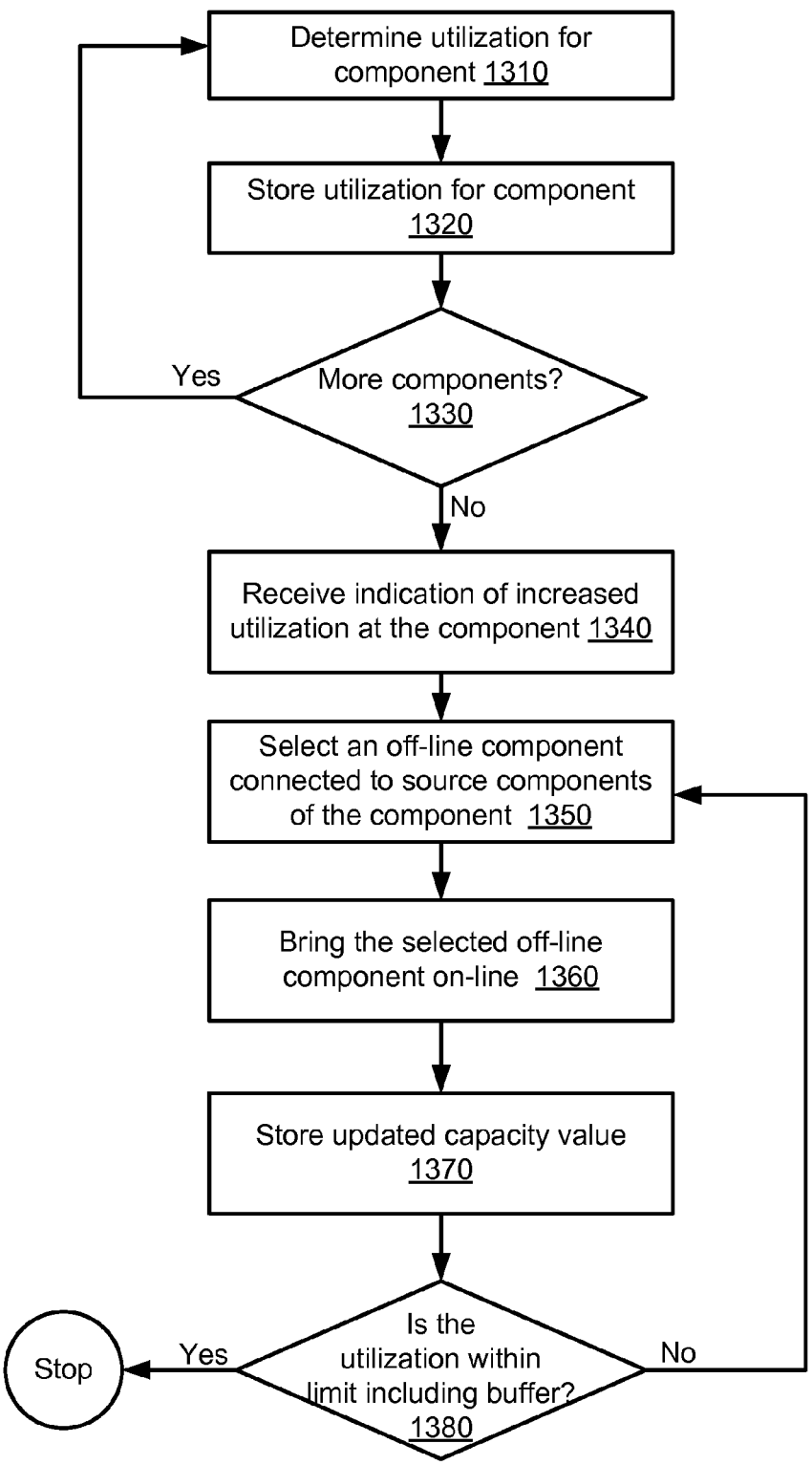
FIG. 13 is a flow chart of a method of enabling a disabled switching portion within a distributed network switch, according to an embodiment.

FIG. 13 is a flow chart of a method of enabling a disabled switching portion within a distributed network switch, according to an embodiment. Method 1300 can be implemented, for example, as a software module (e.g., source code, object code, one or more scripts, or instructions) stored at a memory and operable to be executed and/or interpreted or compiled at a processor operatively coupled to the memory at a control module so some other portion of a distributed network switch. For example, processor-executable instructions stored at a memory of a control module can be executed at a processor at the control module to cause the processor to execute the steps of method 1300. In some embodiments, method 900 can be implemented as one or more hardware modules such as, for example, an ASIC, an FPGA, a processor, or other hardware module at a control module. In some embodiments, method 1300 can be implemented as a combination of one or more hardware modules and software modules at a control module.

Utilization for a component (i.e., a switching portion) of a distributed network switch is determined, at 1310. For example, a control module of a distributed network switch can send a control command including a request to access (e.g., read) a value of a utilization operational parameter of a switch device to a management module operatively coupled to the switch device. The utilization value can then be stored, for example, at a memory of or accessible to the control module, at 1320. If there are more components in the distributed network switch, at 1330, steps 1310 and 1320 can be repeated, at 1330, for each component of the distributed network switch. In some embodiments, not every component of a distributed network switch is monitored or managed. In other words, a control module, for example, performing process 1300 can determine and/or store utilization values for some components of the distributed network switch, but not for other components of the distributed network switch. Thus, steps 1310 and 1320 can be performed for some, but not all of the components of a distributed network switch.

After a utilization value has been determined for each component (e.g., each managed component), at 1330, an indication of increased utilization at a component is received, at 1340. For example, an access switch can send a notification to a control module that a computer server operatively coupled to that access server is sending an increasing amount of data. In some embodiments, a control module can poll components or request information related to increases in utilization without receiving an indication of increased utilization. In some embodiments, an access switch can send or provide in response to a control command query an indication that ingress queues or ports receiving data at an increased and/or increasing rate.

In some embodiments, the indication of an increased utilization can be received in response to the utilization values determined at steps 1310, 1320 and 1330. For example, a control module can analyze the utilization values (and/or aggregate utilization values) by comparing those values to a capacity value related to a capacity of a distributed network switch, multiple components, and/or a group or groups of components. If utilization value is not greater than the capacity value by a threshold or buffer value, the indication of increased utilization can be generated and/or received. If the utilization value is greater than the capacity value by a threshold or buffer value, the indication of increased utilization can be suppressed and/or not received.

In some embodiments, an indication associated with a rate of increase of a utilization value can be generated and/or received in response to the utilization values determined at steps 1310, 1320 and 1330. In other words, the indication can provide an indication that a utilization value is increasing or decreasing at a rate greater than or less than a threshold. Furthermore, if the utilization value is increasing toward a capacity value at a rate or by an amount greater than a threshold, an indication of increased or increasing utilization can be generated and/or received.

In response to the indication of increased utilization, an off-line component (e.g., a candidate component) can be selected, at 1350, to be enabled or brought on-line. For example, a candidate component can be a component that is operatively coupled (or can be operatively coupled when on-line) to source components of the component that is experiencing an increased or increasing utilization (e.g., a loaded component). Thus, by bringing the candidate component on-line, the capacity of the distributed network switch and/or a group or groups of components can be increased and a portion of the utilization (e.g., data or data traffic) of the loaded component can be handled or processed by the candidate component. After the candidate component is selected, the candidate component is brought on-line, at 1360, and a new capacity value for the distributed network switch and/or a group or groups of components can be determined (or calculated) and stored at a memory, for example, of a communication module, at 1370.

If the utilization (e.g., of the distributed network switch and/or a group or groups of components) is within a threshold or buffer of the capacity, at 1380, method 1300 can stop. In other words, if capacity of the distributed network switch and/or a group or groups of components is greater than the utilization of the distributed network switch and/or a group or groups of components by a buffer or threshold, then method 1300 is complete. If the utilization of the distributed network switch and/or a group or groups of components is not within a threshold or buffer of the capacity, at 1380, method 1300 can return to step 1350 to select another off-line component as another candidate component to be brought on-line. Said differently, if capacity of the distributed network switch and/or a group or groups of components is not greater than the utilization of the distributed network switch and/or a group or groups of components by a buffer or threshold, then another off-line component can be brought on-line to further increase the capacity of the distributed network switch and/or a group or groups of components and/or reduce the utilization of a loaded component.

In some embodiments, method 1300 can include more or fewer steps than illustrated in FIG. 13. Method 1300 can include, for example, notifying components of a distributed network switch that a candidate component will be brought on-line and/or of changes to the distributed network switch that will result from a candidate component being brought on-line. For example, a control module can update switching or routing tables at components via control commands to indicate that the operational state of a component has changed from off-line to on-line.

Additionally, in some embodiments, steps of method 1300 can be rearranged. For example, a control module implementing method 1300 can determine a sufficient number of off-line components to bring on-line such that capacity (e.g., of the distributed network switch and/or a group or groups of components) is greater than utilization by a threshold before bringing any of the off-line components on-line or notifying other components of changes to the distributed network switch. Thus, multiple candidate (or off-line) components can be brought on-line substantially simultaneously.

Furthermore, method 1300 is applicable to changes in operational state of one or more components other than disabling a component. For example, method 1300 is applicable to changing a symbol rate associated with a component and to disabling physical and/or logical channels of a communication module or a link between two communication modules. Moreover, although method 1300 is discussed primarily with reference to a component, these methods are applicable to an entire distributed network switch, multiple components, and/or a group or groups of components.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

A processor can be, for example, a single physical processor such as a general-purpose processor, an ASIC, a PLD, or a FPGA having a single processing core or a group of processing cores. In some embodiments, a processor can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In some embodiments, a processor can be a group of distributed processors (e.g., computing devices with one or more physical processors) operatively coupled one to another via a communications network. Said differently, a processor can be a group of distributed processors in communication one with another via a communications network. In some embodiments, a processor can be a combination of such processors. For example, a processor can be a group of distributed computing devices, where each computing device includes a group of physical processors sharing a memory bus and each physical processor includes a group of processing cores.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
 accessing a first utilization value associated with a first switching portion of a distributed network switch;
 accessing a second utilization value associated with a second switching portion of the distributed network switch;
 defining a third utilization value associated with the second switching portion of the distributed network switch, the third utilization value based on the first utilization value and the second utilization value;
 sending to the first switching portion of the distributed network switch a deactivate signal in response to the third utilization value, the first switching portion of the distributed network switch ceasing communication within the distributed network switch in response to the deactivate signal; and
 updating a forwarding entry associated with the first switching portion of the distributed network switch at a forwarding table associated with a third switching portion of the distributed network switch such that a value of the forwarding entry indicates the first switching portion of the distributed network switch is deactivated.

2. The method of claim 1, further comprising determining, before the sending, that the third utilization value is less than a capacity value associated with the distributed network switch by at least a threshold value, the sending being in response to the determining.

3. The method of claim 1, wherein the first utilization value is associated with the first switching portion during a first period and the second utilization value is associated with the second switching portion during the first period, the method further comprising:
 accessing a fourth utilization value at a memory of a management module associated with the distributed network switch, the fourth utilization value defined by an aggregate of a utilization value associated with the first switching portion during a second period before the first period and a utilization value associated with the second switching portion during the second period; and determining, before the sending, that the third utilization value is less than the fourth utilization value by at least a threshold value, the sending being in response to the determining.

4. The method of claim 1, wherein the third utilization value is an estimate of a utilization of the second switching portion of the distributed network switch in the absence of the first switching portion of the distributed network switch from the distributed network switch.

5. The method of claim 1, wherein:
the distributed network switch is a multi-stage switch fabric;
the first switching portion of the distributed network switch is a first switching portion of a stage of the multi-stage switch fabric; and
the second switching portion of the distributed network switch is a second switching portion of the stage of the multi-stage switch fabric.

6. The method of claim 1, further comprising:
detecting, after the sending to the first switching portion of the distributed network switch the deactivate signal, an increase in a fourth utilization value associated with the second switching portion of the distributed network switch;
sending, in response to the detecting, to the first switching portion of the distributed network switch an activate signal, the first switching portion of the distributed network switch resuming communication within the distributed network switch in response to the activate signal; and
updating the forwarding entry associated with the first switching portion of the distributed network switch at the forwarding table associated with the third switching portion of the distributed network switch such that the value of the forwarding entry indicates the first switching portion of the distributed network switch is activated.

7. The method of claim 1, further comprising:
defining a capacity value associated with the distributed network switch based on the absence of the first switching portion of the distributed network switch from the distributed network switch;
storing the capacity value at a memory of a management module associated with the distributed network switch; and
determining, before the sending, that the third utilization value is less than the capacity value by at least a threshold value, the sending being in response to the determining.

8. The method of claim 1, further comprising:
aggregating the first utilization value and the second utilization value to define a fourth utilization value associated with a utilization of the distributed network switch;
storing the fourth utilization value at a memory of a management module associated with the distributed network switch; and
determining, before the sending, that the third utilization value is less than the fourth utilization value by at least a threshold value, the sending being in response to the determining.

9. A system, comprising:
a first switching portion operatively coupled to a distributed network switch and configured to define a utilization value associated with the first switching portion;
a second switching portion operatively coupled to the distributed network switch and configured to define a utilization value associated with the second switching portion;
a third switching portion operatively coupled to the distributed network switch, the third switching portion in communication with the first switching portion and the second switching portion via the distributed network switch; and
a control module operatively coupled to the first switching portion and to the second switching portion, the control module configured to receive the utilization value associated with the first switching portion from the first switching portion, the control module configured to receive the utilization value associated with the second switching portion from the second switching portion, the control module configured to deactivate at least one of the first switching portion or the second switching portion based on the utilization value associated with the first switching portion and the utilization value associated with the second switching portion, the control module configured to update a forwarding entry associated with the first switching portion at a forwarding table stored at a memory of the third switching portion such that the third switching portion ceases communication with the first switching portion.

10. The system of claim 9, wherein:
the distributed network switch includes a multi-stage switch fabric; the first switching portion of the distributed network switch is a first switching portion of a first stage of the multi-stage switch fabric;
the second switching portion of the distributed network switch is a second switching portion of the first stage of the multi-stage switch fabric; and
the third switching portion of the distributed network switch is a first switching portion of a second stage of the multi-stage switch fabric.

11. The system of claim 9, wherein:
the utilization value associated with the first switching portion is a first utilization value associated with the first switching portion;
the utilization value associated with the second switching portion is a second utilization value associated with the first switching portion;
the control module is configured to receive the second utilization value associated with the first switching portion from the first switching portion; and
the control module is configured to receive the second utilization value associated with the second switching portion from the second switching portion, the control module configured to deactivate at least one of the first switching portion or the second switching portion based on the second utilization value associated with the first switching portion and the second utilization value associated with the second switching portion, the control module configured to update a forwarding entry associated with the at least one deactivated switching portion at a forwarding table stored at a memory of the third switching portion such that the third switching portion ceases communication with the at least one switching portion.

12. The system of claim 9, wherein:
the first switching portion includes a management module in communication with the control module; and
the second switching portion includes a management module in communication with the control module.

13. A method, comprising:
- receiving a utilization value associated with each switching portion from a plurality of switching portions of a distributed network switch;
- defining, at a first time, an aggregate utilization value based on the utilization value of each switching portion from the plurality of switching portions;
- accessing a capacity value at a memory of a management module associated with the distributed network switch, the capacity value being defined at a second time before the first time;
- sending, after the defining and the accessing, an activate signal to a first switching portion of the distributed network switch if the aggregate utilization value is not less than the capacity value by a threshold value, the first switching portion deactivated at the first time, the aggregate utilization value not including a utilization value of the first switching portion; and
- updating, after the sending, a forwarding entry associated the first switching portion at a forwarding table associated with a second switching portion of the distributed network switch such that a value of the forwarding entry indicates the first switching portion of the distributed network switch is activated, the second switching portion activated at the first time.

14. The method of claim 13, wherein the capacity value is a first capacity value associated with the distributed network switch at a third time before the first time, the method further comprising:
- determining a second capacity value associated with the distributed network switch after the sending; and
- storing the second capacity value at the memory of the management module.

15. The method of claim 13, wherein:
- the distributed network switch is a multi-stage switch fabric;
- the first switching portion of the distributed network switch is a switching portion of a first stage of the multi-stage switch fabric;
- the plurality of switching portions of the distributed network switch is a plurality of switching portions of the first stage of the multi-stage switch fabric; and
- the second switching portion of the distributed network switch is a first switching portion of a second stage of the multi-stage switch fabric.

16. The method of claim 13, further comprising selecting, before the sending, the first switching portion from a plurality of deactivated switching portions within the distributed network switch such that a projected aggregate utilization value is less than the capacity value by the threshold value, the projected aggregate utilization value based on the utilization value of each switching portion from the plurality of switching portions and a projected utilization of the first switching portion, the selecting based on a capacity of the first switching portion.

17. The method of claim 13, wherein the sending is at a third time, the method further comprising:
- selecting, before the third time, the first switching portion from a plurality of deactivated switching portions;
- determining, before the third time, that a first projected aggregate utilization value is not less than the capacity value by the threshold value, the first projected aggregate utilization value based on the utilization value of each switching portion from the plurality of switching portions and a projected utilization of the first switching portion;
- selecting, before the third time, a third switching portion of the distributed network switch from a plurality of deactivated switching portions within the distributed network switch such that a second projected aggregate utilization value is less than the capacity value by the threshold value,
- the projected aggregate utilization value based on the utilization value of each switching portion from the plurality of switching portions, the projected utilization of the first switching portion and a projected utilization of the third switching portion;
- sending an activate signal to the third switching portion of the distributed network switch after the selecting of the third switching portion; and
- updating, after the sending, a forwarding entry associated the third switching portion at a forwarding table associated with the second switching portion of the distributed network switch such that a value of the forwarding entry indicates the third switching portion of the distributed network switch is activated.

18. The method of claim 13, wherein:
- the distributed network switch is a multi-stage switch fabric;
- the first switching portion of the distributed network switch is a first line card within a chassis of the multi-stage switch fabric;
- the second switching portion of the distributed network switch is a second line card within the chassis of the multi-stage switch fabric; and
- the plurality of switching portions of the distributed network switch is a plurality of line cards within the chassis of the multi-stage switch fabric.

* * * * *